(12) United States Patent
Koo et al.

(10) Patent No.: US 12,386,021 B2
(45) Date of Patent: Aug. 12, 2025

(54) METHOD AND DEVICE FOR UWB COMMUNICATION

(71) Applicant: Samsung Electronics Co., Ltd., Gyeonggi-do (KR)

(72) Inventors: Jonghoe Koo, Gyeonggi-do (KR); Jinwook Seo, Gyeonggi-do (KR); Hyunseob Oh, Gyeonggi-do (KR); Mingyu Lee, Gyeonggi-do (KR); Taeyoung Ha, Gyeonggi-do (KR); Haeyoung Jun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 161 days.

(21) Appl. No.: 17/860,420

(22) Filed: Jul. 8, 2022

(65) Prior Publication Data

US 2023/0019120 A1    Jan. 19, 2023

(30) Foreign Application Priority Data

Jul. 8, 2021   (KR) .......................... 10-2021-0089683

(51) Int. Cl.
*G01S 5/10*    (2006.01)
*H04B 1/7163*  (2011.01)

(52) U.S. Cl.
CPC .............. *G01S 5/10* (2013.01); *H04B 1/7163* (2013.01)

(58) Field of Classification Search
CPC ........ G01S 5/10; G01S 13/765; G01S 5/0252; G01S 5/0295; G01S 5/14; G01S 13/0209;
(Continued)

(56) References Cited

U.S. PATENT DOCUMENTS

2014/0342670 A1   11/2014  Kang et al.
2019/0199398 A1    6/2019  Hammerschmidt et al.
(Continued)

FOREIGN PATENT DOCUMENTS

EP         4171135 A1 *  4/2023  ............. G01S 11/06
KR    10-2014-0135569    11/2014
(Continued)

OTHER PUBLICATIONS

IEEE Std 802.15.4-2020 ("IEEE Standard for Low-Rate Wireless Networks—Amendment 1: Enhanced Ultra Wideband (UWB) Physical Layers (PHYs) and Associated Ranging Techniques," in IEEE Std 802.15.4z-2020 (Amendment to IEEE Std 802.15.4-2020), vol., No., pp. 1-174, Aug. 25, 2020 (Year: 2020).*
(Continued)

*Primary Examiner* — Sam K Ahn
*Assistant Examiner* — Amneet Singh
(74) *Attorney, Agent, or Firm* — The Farrell Law Firm, P.C.

(57) ABSTRACT

Disclosed is a method for performing downlink time difference of arrival (DL-TDoA) by an ultra-wide band (UWB) device that includes selecting at least one active ranging round from a ranging block based on at least one of location information or motion information about the UWB device, transferring, to a UWB sub system, a command including information about the at least one active ranging round, and performing a DL-TDoA operation based on the information about the at least one active ranging round.

18 Claims, 26 Drawing Sheets

(58) Field of Classification Search
CPC ....... H04B 1/7163; H04B 2201/71634; H04W 76/11; H04W 64/006; H04W 4/70
See application file for complete search history.

(56) References Cited

U.S. PATENT DOCUMENTS

| | | | |
|---|---|---|---|
| 2019/0274130 A1 | 9/2019 | Cheng et al. | |
| 2020/0150262 A1 | 5/2020 | Kim et al. | |
| 2020/0228943 A1 | 7/2020 | Martin et al. | |
| 2021/0389410 A1* | 12/2021 | Yerramalli | H04W 64/00 |
| 2021/0392454 A1* | 12/2021 | Choi | H04L 5/0094 |
| 2022/0174626 A1 | 6/2022 | Yang et al. | |
| 2022/0317235 A1* | 10/2022 | Ye | G01S 5/12 |
| 2023/0325807 A1* | 10/2023 | Suzuki | G01S 13/765 |

FOREIGN PATENT DOCUMENTS

| | | | | |
|---|---|---|---|---|
| KR | 1020210020616 | | 2/2021 | |
| WO | WO-2020164741 A1 * | 8/2020 | | H04L 5/0035 |
| WO | WO 2021/089195 | | 5/2021 | |

OTHER PUBLICATIONS

Apple Inc. et al. ("Digital Car Key-UWB MAC and Channel Access Specification", Aug. 8, 2019) (Year: 2019).*
International Search Report dated Oct. 24, 2022 issued in counterpart application No. PCT/KR2022/009987, 6 pages.
Bai Yan et al., "Research on UWB Indoor Positioning Based on TDOA Technique", The Ninth International Conference on Electronic Measurement & Instruments, 2009, 4 pages.
Yuan Xue et al., "A Model on Indoor Localization System Based on the Time Difference Without Synchronization", Special Section on Towards Service-Centric Internet of Things (IOT): From Modeling to Practice, 2018, 11 pages.
Nicola Macoir et al., "UWB Localization with Battery-Powered Wireless Backbone for Drone-Based Inventory Management", Sensors, 2019, 18 pages.
European Search Report dated Aug. 13, 2024 issued in counterpart application No. 22838058.0-1206, 13 pages.

* cited by examiner

| UPDATE_ACTIVE_RANGING_ROUND_CMD | | | |
|---|---|---|---|
| Fields | Length | Tag (IDs) | Value/Description |
| Session ID | 1 byte | 0xX1 | ID of session of receiving anchor message for downlink TDoA localization |
| Number of ranging round | 1 byte | 0xX2 | Number of ranging rounds in ranging block |
| Active Ranging Round bitmap (alt.1) | Variable | 0xX3 | Represent, in bitmap, ranging round to be operated as active ranging round e.g.,) 10110000 ... 00 (active in 1st, 3rd, and 4th ranging rounds, and sleep in the rest) |
| Active Ranging Round List (alt.2) | Variable | 0xX3 | Represent, in list of integers, ranging rounds to be operated as active ranging rounds e.g.,) 0x010304 (active in 1st, 3rd, and 4th ranging rounds, and sleep in the rest) |
| Block striding length | 1 byte | 0xX4 | Number of ranging blocks to be skipped e.g.,) value = 0x02: after overhearing one ranging block, skip following two ranging blocks and then overhear third ranging round |

FIG. 13

CORE_SET_CONFIG_CMD

| Payload Field(s) | Length | Value/ Description | | |
|---|---|---|---|---|
| Number of Parameters | 1 Octet | The number (n) of Parameters (TLV) to follow. Below each Parameter is in TLV structure. | | |
| Parameter [1..n] | (m+2)*n Octets | Type | 1 Octet | The identifier of the configuration parameter. See Table 28 for list of IDs. |
| | | Length | 1 Octet | The length of the Value(m). If Length is equal to 0x00, then the Value field is omitted, and the UWBS shall set the configuration Parameter to its default value. |
| | | Value | m Octets | The value of the configuration Parameter. |

(a)

| Parameter Name (*): Can be applied during session active state as well | Length (Octets) | Tag (IDs) | Description Note: unassigned values are reserved for future use |
|---|---|---|---|
| Active ranging round (alt.1) | Variable | 0xYY | The bitmap representing the indexes of ranging rounds where the device operates in active state. |
| Active ranging round (alt.2) | Variable | 0xYY | The list of the indexes of ranging rounds where the device operates in active state. |

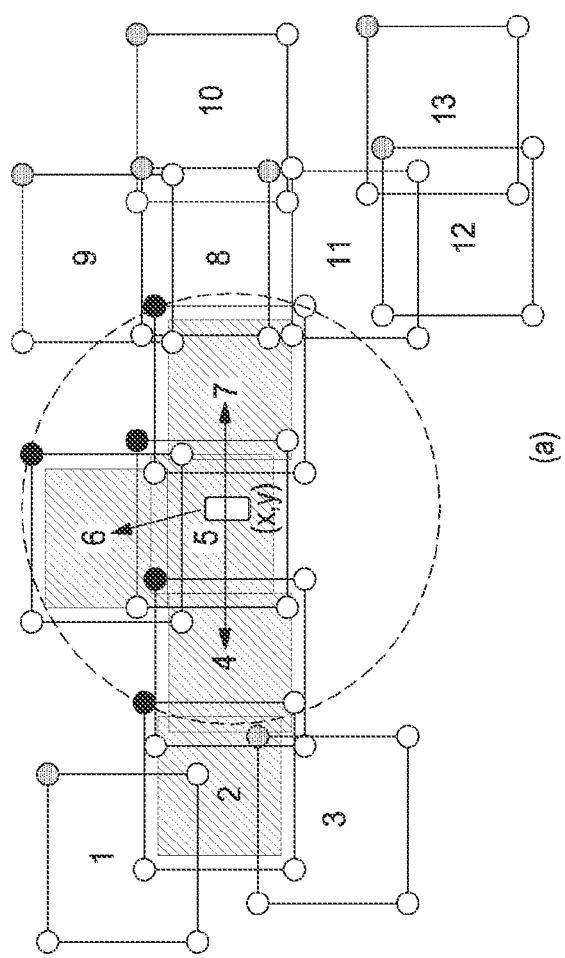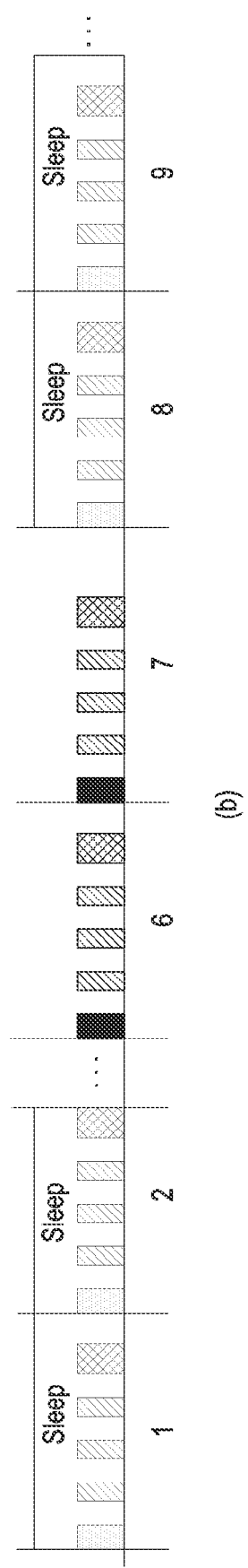
FIG. 16

METHOD AND DEVICE FOR UWB COMMUNICATION

CROSS-REFERENCE TO RELATED APPLICATION(S)

This application is based on and claims priority under 35 U.S.C. § 119 to Korean Patent Application No. 10-2021-0089683, which was filed in the Korean Intellectual Property Office on Jul. 8, 2021, the entire disclosure of which is incorporated herein by reference.

BACKGROUND

1. Field

The disclosure generally relates to ultra-wide band (UWB) communication and, more specifically, to a method and device for providing a downlink time difference of arrival (DL-TDoA).

2. Description of Related Art

The Internet is evolving from the human-centered connection network by which humans create and consume information to the Internet of things (IoT) network by which information is communicated and processed between things or other distributed components. Another arising technology is the Internet of everything (IoE), which is a combination of big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet technology services that collect and analyze the data generated by the things connected with one another to create human life with a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using UWB, which is a wireless communication technology that uses a very wide frequency band of several GHz or more in a baseband without using a wireless carrier.

SUMMARY

The disclosure has been made to address at least the above-mentioned problems and/or disadvantages and to provide at least the advantages described below. The disclosed embodiments provide a low-power DL-TDoA localization method and a UWB device therefor.

According to an aspect of the disclosure, a method performed by an UWB device is provided that includes transferring, to a UWB subsystem (UWBS) of the UWB device, at least one configuration information for DL-TDoA ranging, wherein the at least one configuration information comprises active ranging round information including a list of indexes of at least one active ranging round for which the UWB device receives a downlink TDoA Message (DTM) message via the UWBS from at least one anchor device; receiving at least one DTM from the at least one anchor device via the UWBS, in the at least one active ranging round, wherein the at least one active ranging round is configured based on the active ranging round information; and determining a location of the UWB device based on the at least one DTM. According to another aspect of the disclosure, a UWB device is provided that includes a transceiver and a controller connected to the transceiver, with the controller being configured to transfer, to a UWBS of the UWB device, at least one configuration information for DL-TDoA ranging, with the at least one configuration information comprising active ranging round information including a list of indexes of at least one active ranging round for which the UWB device receives a DTM via the UWBS from at least one anchor device; receive at least one DTM from the at least one anchor device via the UWBS, in the at least one active ranging round, wherein the at least one ranging round is configured based on the active ranging round information; and determine a location of the UWB device based on the at least one DTM.

BRIEF DESCRIPTION OF THE DRAWINGS

The above and other aspects, features, and advantages of certain embodiments of the disclosure will be more apparent from the following detailed description taken in connection with the accompanying drawings, in which:

FIG. 13 illustrates a first UCI command including an active ranging round parameter and a block striding length parameter according to an embodiment;

FIG. 14 illustrates a second UCI command including an active ranging round parameter according to an embodiment;

FIG. 16 illustrates a method in which a UWB device performs a power saving operation based on a user location, according to an embodiment;

DETAILED DESCRIPTION

Figure 1:
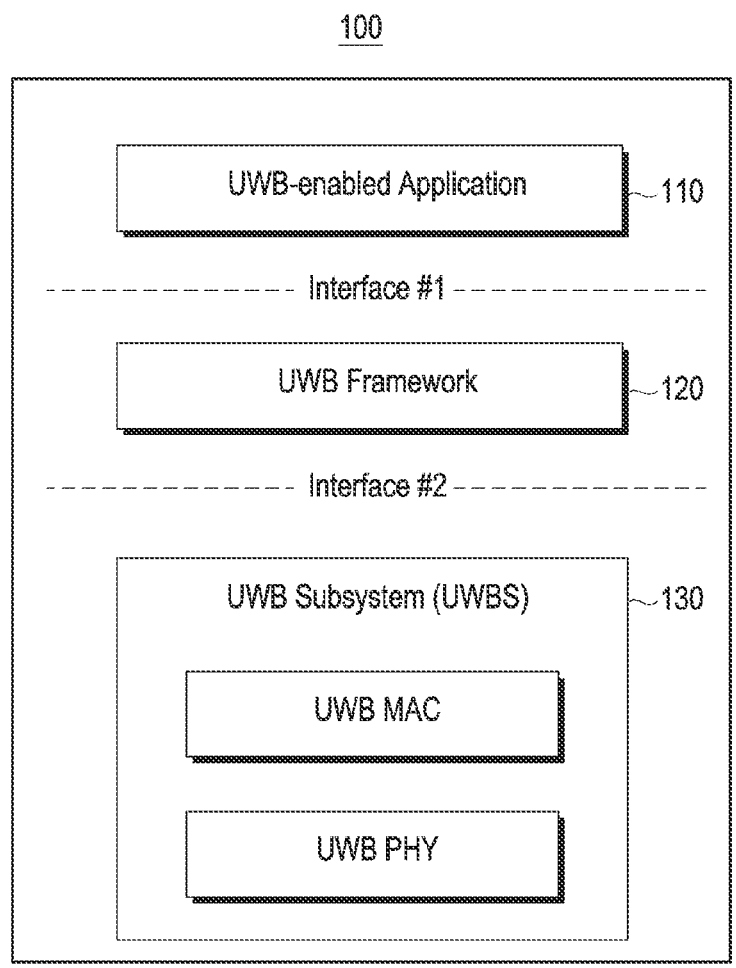
FIG. 1 illustrates architecture of a UWB device.

Hereinafter, embodiments are described in detail with reference to the accompanying drawings. Descriptions of well-known functions and constructions are omitted for the sake of clarity and conciseness.

For the same reasons, some elements may be exaggerated, omitted or schematically shown. The size of each element does not necessarily reflect the actual size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices facilitate performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, in some replacement execution examples, the functions mentioned in the blocks may occur in different orders. For example, two blocks that are consecutively shown may be performed substantially simultaneously or in a reverse order depending on corresponding functions.

As used herein, the term unit means a software element or a hardware element such as a field-programmable gate array (FPGA) or an application specific integrated circuit (ASIC). A unit plays a certain role. However, unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, micro codes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card. Also, in certain embodiments, a unit may include one or more processors.

As used herein, the term terminal or device may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Aspects of the disclosure of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include an M2M terminal and an MTC terminal/device, but is not limited thereto. Herein, the terminal may be referred to as an electronic device or simply as a device.

Embodiments of the present disclosure are described in detail with reference to the accompanying drawings. Further, although a communication system using UWB is described in connection with embodiments, as an example, embodiments may also apply to other communication systems with similar technical background or features. For example, a communication system using Bluetooth™ or ZigBee™ may be included therein. Further, embodiments may be modified in such a range as not to significantly depart from the scope of the disclosure under the determination by one of ordinary skill in the art and such modifications may be applicable to other communication systems.

The terms as used herein are defined considering the functions described herein and may be replaced with other terms according to the intention or practice of the user or operator, with such terms being defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth™, ZigBee™, and UWB. A wireless network in which such a wireless network technology is implemented may include a plurality of electronic devices.

UWB refers to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB may enable secure and accurate ranging between devices. Thus, UWB enables relative position estimation based on the distance between two devices or accurate position estimation of a device based on the distance from fixed devices whose positions are known.

Application dedicated file (ADF) is, e.g., a data structure in an application data structure that may host an application or application specific data.

Application protocol data unit (APDU) is a command and a response used when communicating with the application data structure in the UWB device.

Application specific data is, e.g., a file structure having a root level and an application level including UWB controllee information and UWB session data required for a UWB session.

Controller is a ranging device that defines and controls ranging control messages (RCM) or control messages. Controller may define and control ranging features by sending the control message.

Controlee is a ranging device using a ranging parameter in the RCM or control message received from the controller. Controlee may use the ranging features as configured via the control message from the controller.

Unlike static STS, dynamic scrambled timestamp sequence (STS) mode is an operation mode in which the STS is not repeated during a ranging session. In this mode, the STS may be managed by the ranging device, and the ranging session key that generates STS may be managed by a secure component.

Applet is, e.g., an applet executed on the secure component including UWB parameters and service data, with the Applet being a FiRa Applet defined by FiRa.

Ranging device is a device capable of performing UWB ranging, including an enhanced ranging device (ERDEV) defined in IEEE 802.15.4z or a FiRa device defined by FiRa. The ranging device may be referred to as a UWB device.

UWB-enabled application is an application for UWB service. For example, the UWB-enabled application may be an application using a framework API for configuring an out-of-band (OOB) connector, a secure service, and/or a UWB service for a UWB session. UWB-enabled application may be abbreviated as an application or a UWB application. UWB-enabled application may be a FiRa-enabled Application defined by FiRa.

Framework is a component that provides access to profiles, individual-UWB settings and/or notifications. "Framework" may be, e.g., a collection of logical software components including the profile manager, OOB connector, secure service, and/or UWB service. The framework may be a FiRa Framework defined by FiRa.

OOB connector is a software component for establishing an OOB connection, e.g., Bluetooth™ low energy (BLE) connection, between ranging devices, and the OOB connector may be a FiRa OOB connector defined by FiRa.

Profile is a previously defined set of UWB and OOB configuration parameters, and profile may be a FiRa Profile defined by FiRa.

Profile manager is a software component that implements a profile available on the ranging device, and the profile manager may be a FiRa profile manager defined by FiRa.

Service is an implementation of a use case that provides a service to an end-user.

Smart ranging device is a ranging device that may implement an optional framework API, and the Smart ranging device may be a FiRa Smart Device defined by FiRa.

Global dedicated file (GDF) is a root level of application specific data including data required to establish a USB session.

Framework API is an API used by a UWB-enabled application to communicate with the framework.

Initiator is a ranging device that initiates a ranging exchange. Initiator may initiate the ranging exchange by sending a first RFRAME (ranging initiation message).

Object identifier (OID) is an identifier of the ADF in the application data structure.

OOB is data communication that does not use UWB as an underlying wireless technology.

Ranging data set (RDS) is data, e.g., UWB session key, session ID, etc., for establishing a UWB session when it is needed to protect confidentiality, authenticity and integrity.

Responder is a ranging device that responds to the initiator in a ranging exchange. Responder may respond to the ranging initiation message received from the initiator.

STS is a ciphered sequence for increasing the integrity and accuracy of ranging measurement timestamps. The STS may be generated from the ranging session key.

Secure channel is a data channel that prevents overhearing and tampering.

Secure component is an entity, e.g., SE or TEE, having a defined security level that interfaces with UWBS for the purpose of providing RDS to UWBS, e.g., when dynamic STS is used.

Secure element (SE) is a tamper-resistant secure hardware component that may be used as a secure component in the ranging device.

Secure ranging is ranging based on STS generated through a strong encryption operation.

Secure service is a software component for interfacing with a Secure Component, such as an SE or a trusted execution environment (TEE).

Service applet is an applet on a secure component that handles service specific transactions.

Service data is data defined by a service provider that needs to be transferred between two ranging devices to implement a service.

Service provider is an entity that defines and provides hardware and software required to provide a specific service to an end-user.

Static STS mode is an operation mode in which STS is repeated during a session, and does not need to be managed by the secure component.

Secure UWB service (SUS) Applet is an applet on the SE that communicates with the applet to retrieve data needed to enable secure UWB sessions with other ranging devices. The SUS Applet may transfer corresponding data (information) to the UWBS.

UWB service is a software component that provides access to the UWBS.

UWB session is a period from when the controller and the controllee start communication through UWB until the communication stops. A UWB Session may include ranging, data transfer, or both ranging and data transfer.

UWB session ID is an ID (e.g., a 32-bit integer) that identifies the UWB session, shared between the controller and the controller.

UWB session key is a key used to protect the UWB Session. The UWB Session Key may be used to generate the STS. In this disclosure, the UWB Session Key may be a UWB Ranging Session Key (URSK), and may be abbreviated as a session key.

UWB subsystem (UWBS) is a hardware component implementing the UWB PHY and MAC layers specifications. UWBS may have an interface to framework and an interface to secure component to search for RDS.

DL-TDoA (DT), reverse TDoA, and its default operation may be for the UE (tag device (DT-tag))(UWB device) to overhear (or, receive) the message of an anchor device (DT-anchor) while a plurality of anchor devices broadcast or exchange messages. DL-TDoA may be classified as a type of one way ranging like uplink TDoA.

In DL-TDoA, one or a plurality of tag devices may estimate their location based on a DL-TDo message (DTM) received from at least one anchor device. The UE performing the DL-TDoA operation may overhear the messages transmitted by the two anchor devices to calculate a TDoA proportional to the difference between the distances between each anchor device and the UE. The UE may calculate a relative distance to the anchor device by using TDoA with several pairs of anchor devices and use it for positioning. The operation of the anchor device for DL-TDoA may be similar to that of double side-two way ranging (DS-TWR) defined in IEEE 802.15.4z and may further include other useful time information so that the UE may calculate the TDoA. For example, the anchor device may include the transmission time in DTM. DL-TDoA may be referred to as DL-TDoA localization.

Anchor device may be referred to as is a DT-anchor, a UWB anchor or a UWB anchor device, or the like, and may be a UWB device deployed in a specific location to provide a positioning service. For example, the anchor device may be a UWB device installed by a service provider on a wall, ceiling, structure, or the like in a room to provide an indoor positioning service. The anchor device may transmit a DTM that the tag device may use to calculate a location based on TDoA localization (DL-TDoA localization). Anchor devices may be divided into initiator anchors and responder anchors according to the order and role of transmitting messages.

Initiator anchor may be referred to as an initiator DT-anchor, an initiator UWB anchor, an initiator anchor device, or the like, and may announce the start of a specific ranging round. The initiator anchor may schedule a ranging slot for the responder anchors operating in the same ranging round to respond. The initiation message of the initiator anchor may be referred to as an initiator downlink DTM, poll DTM or poll message. The initiation message of the initiator anchor may include a transmission timestamp.

The initiator anchor may additionally transfer a final message after receiving responses from the responder anchors. The initiator anchor may additionally transmit the final DTM in a DL-TDoA ranging round after all responder anchors in the same cluster transmit a response message (response DTM) in the DL-TDoA ranging round. The final message of the initiator anchor may be referred to as a final DTM. The final message may include the time of the reply to the messages sent by the responder anchors. The end message may include a transmission timestamp.

Responder anchor may also be referred to as a responder DT-anchor, a responder UWB anchor, a responder UWB anchor device, a responder anchor device, etc. The responder anchor may be a UWB anchor responding to the initiation message of the initiator anchor. The message with which the responder anchor responds may include the time of reply to the initiation message. The responder anchor may respond to the initiator anchor using a response message. The message with which the responder anchor responds may be referred to as a response DTM, a responder DTM or a response message. The response message of the responder anchor may include a transmission timestamp.

Tag device may also be referred to as UWB tag, user device, UWB tag device or DT-tag, etc. The tag device may estimate its location (e.g., geographical coordinates) by using TDoA measurements based on DTMs transmitted by DT-Anchors. The tag device may have knowledge of the locations of the DT-Anchors.

The tag device may receive and measure the reception time of messages transmitted by DT-Anchors. The tag device may obtain the geographical coordinates of the DTAnchors via either an in-band or out-of-band method. The tag device may skip ranging blocks when the location update rate is lower than that supported by a DL-TDoA network.

Cluster is a set of UWB anchors covering a specific area. The cluster may be composed of an initiator UWB anchor and responder UWB anchors responding thereto. For two-dimensional (2D) positioning, one initiator UWB anchor and at least three responder UWB anchors are typically required and, for three-dimensional (3D) positioning, one initiator UWB anchor and at least four responder UWB anchors are required. If the initiator UWB anchor and the responder UWB anchor may be accurately time-synchronized through a separate wired/wireless connection, one initiator UWB anchor and two responder UWB anchors are required for 2D positioning, and one initiator UWB anchor and three responder UWB anchors are required for 3D positioning. Unless otherwise stated, it is assumed that there is no separate device for wired/wireless time synchronization between UWB anchors. The cluster area may be a space formed by the UWB anchors constituting the cluster. To support the positioning service for a wide area, a plurality of clusters may be configured to provide the positioning service to the UE. In this disclosure, a cluster may be referred to as a cell. The operation of the cluster may be understood as the operation of anchor(s) belonging to the cluster.

Active ranging round is a ranging round in which the UE (DT-tag) (UWB device) performing a role of a tag in DL-TDoA operates in an active state. In the active ranging round or in the active state, the UE may overhear or receive the message transmitted by the anchor device, with the active ranging round being referred to as an active round. In the active ranging round, the UWBS of the DT-tag (or DT-tag) may turn on a receiver (or UWBS) to receive DTMs from DT-anchors. In the active ranging round, the UWBS of the DT-tag may be active as the DT-tag.

Inactive ranging round is a ranging round in which the UE (DT-tag) (UWB device) playing a tag role in DL-TDoA operates in an inactive state or a sleep state. In the inactive ranging round or in the inactive state (sleep state), the UE cannot overhear the message transmitted by the anchor device. In this disclosure, the inactive ranging round may be referred to as a sleep ranging round, an inactive round, or a sleep round.

Hereinafter, aspects of the disclosure are described with reference to the accompanying drawings.

FIG. 1 illustrates architecture of a UWB device.

The UWB device 100 may be an electronic device supporting UWB communication. The UWB device 100 may be, e.g., a ranging device supporting UWB ranging. In an embodiment, the ranging device may be an ERDEV defined in IEEE 802.15.4z or a FiRa device defined by FiRa.

In the embodiment of FIG. 1, the UWB device 100 may interact with other UWB devices through a UWB session.

The UWB device 100 may implement a first interface (Interface #1) that is an interface between a UWB-enabled application 110 and a UWB framework 120, and the first interface allows the UWB-enabled application 110 on the UWB device 100 to use the UWB capabilities of the UWB device 100 in a predetermined manner. In an embodiment, the first interface may be a Framework API or a proprietary interface, but is not limited thereto.

The UWB device 100 may implement a second interface (Interface #2) that is an interface between the UWB framework 120 and a UWBS) 130. In an embodiment, the second interface may be a UWB command interface (UCI) or proprietary interface, but is not limited thereto.

Referring to FIG. 1, the UWB device 100 may include a UWB-enabled application 110, a UWB framework 120, and/or a UWBS 130 including a UWB MAC Layer and a UWB physical layer. Depending on the embodiment, some entities may not be included in the UWB device, or additional entities (e.g., security layer) may be further included.

The UWB-enabled application 110 may trigger establishment of a UWB session by a UWBS 130 through the first interface. The UWB-enabled application 110 may use one profile of previously defined profiles. For example, the UWB-enabled application 110 may use one of the profiles defined in FiRa or a custom profile. The UWB-enabled application 110 may use the first interface to handle related events, such as service discovery, ranging notifications, and/or error conditions.

The framework 120 may provide access to the profiles, individual-UWB settings and/or notifications. The framework 120 may support at least one of a function for UWB ranging and transaction execution, a function to provide an interface to the application and UWBS 130, or a function to estimate the location of the device 100. The framework 120 may be a set of software components. As described above, the UWB-enabled application 110 may interface with the framework 120 through the first interface, and the framework 120 may interface with the UWBS 130 through the second interface.

Meanwhile, the UWB-enabled application 110 and/or framework 120 may be implemented by an application processor (AP) or processor. Accordingly, the operation of the UWB-enabled application 110 and/or the framework 120 may be understood as being performed by an AP or a processor, and the framework may be referred to as an AP or a processor.

The UWBS 130 may be a hardware component including a UWB MAC Layer and a UWB physical layer. The UWBS 130 may perform UWB session management and may communicate with the UWBS of another UWB device. The UWBS 130 may interface with the framework 120 through the second interface and may obtain the security data from the Secure Component. In an embodiment, the framework or AP 120 may transmit a command to the UWBS 130 through UCI, and the UWBS 130 may transmit a response to the command to the framework 120. The UWBS 130 may transfer a notification to the framework 120 through the UCI.

Figure 2:
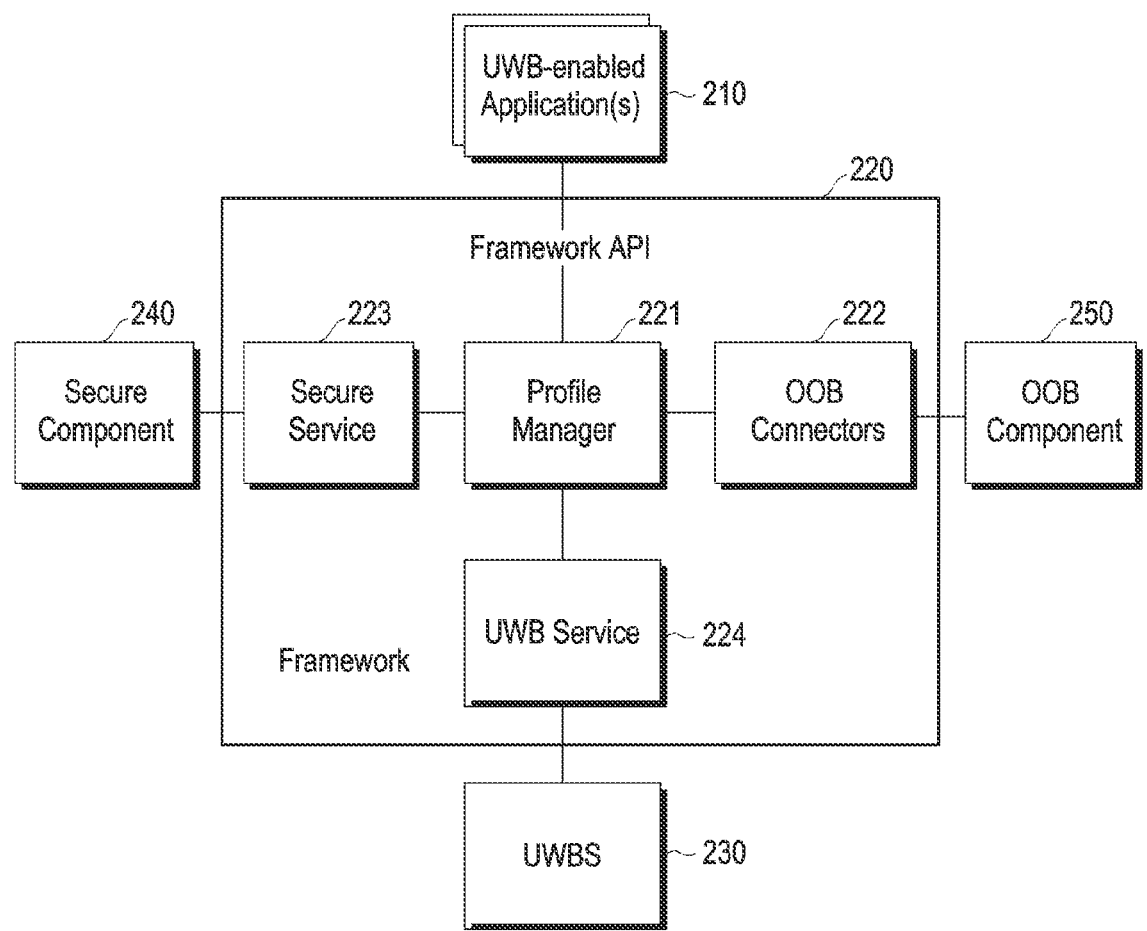
FIG. 2 illustrates framework of a UWB device.

FIG. 2 illustrates a framework of a UWB device.

Referring to FIG. 2, the framework 220 may include, e.g., software components, such as profile manager 221, OOB connector(s) 222, secure service 223 and/or UWB service 224.

The profile manager 221 may serve to manage profiles available on the UWB device. The profile may be a set of parameters required to establish communication between UWB devices. For example, a profile may include a parameter indicating which OOB secure channel is used, a UWB/OOB configuration parameter, a parameter indicating whether the use of a particular secure component is mandatory, and/or a parameter related to the file structure of the ADF. A UWB-enabled application 210 may communicate with the profile manager 221 through the first interface (e.g., framework (API)).

The OOB connector 222 may serve to establish an OOB connection with another device. The OOB connector 222 may handle an OOB step including a discovery step and/or a connection step. The OOB component, e.g., BLE component, 250 may be connected to the 00B connector 222.

The secure service 223 may play a role of interfacing with a secure component 240, such as an SE or a TEE.

The UWB service 224 may perform a role of managing the UWBS 230. The UWB service 224 may provide access to the UWBS 230 from the profile manager 221 by implementing the second interface.

Figure 3:
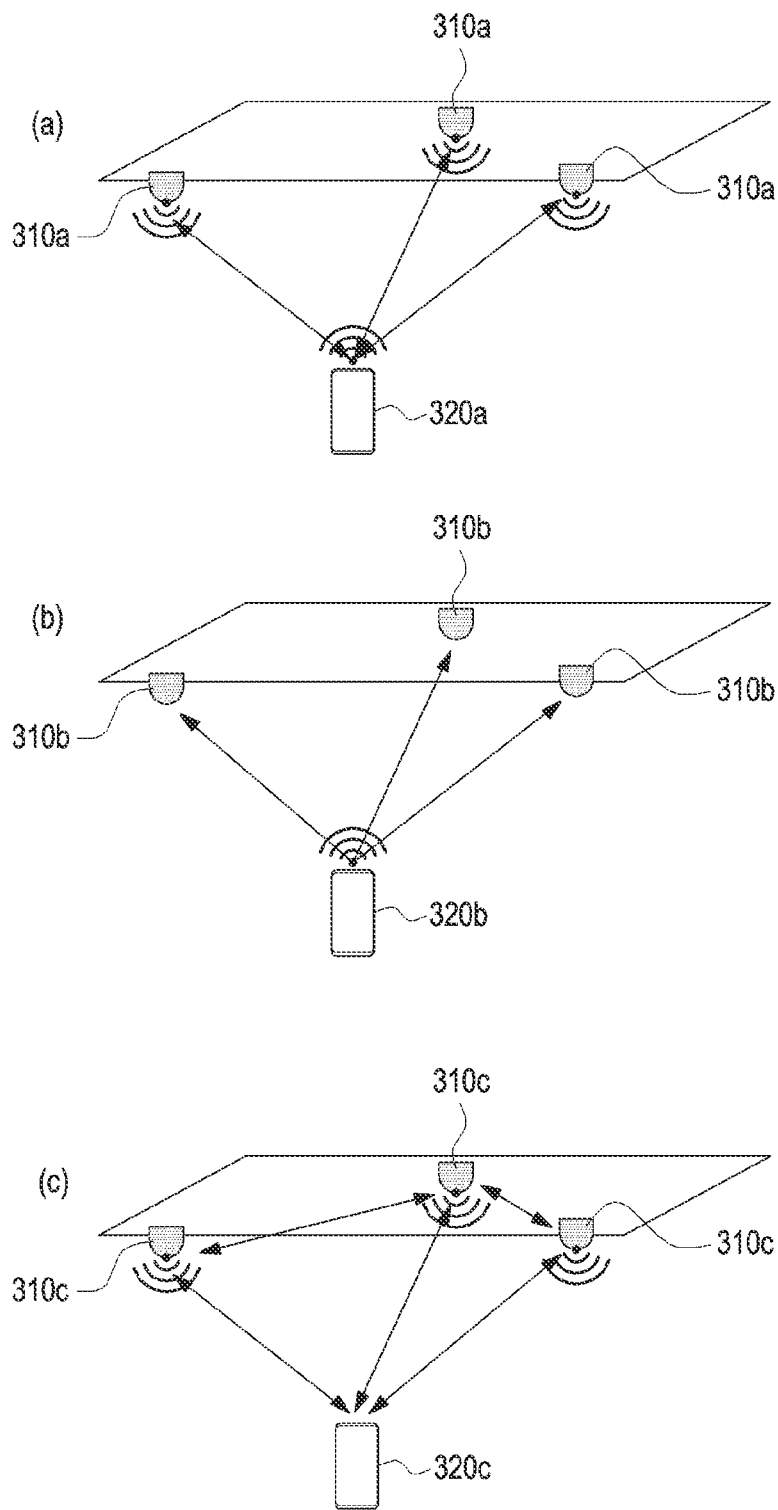
FIG. 3 provides examples of a UWB ranging method.

FIG. 3 provides examples of a UWB ranging method.

Part (a) of FIG. 3 illustrates a two way ranging (TWR) scheme. Part (b) of FIG. 3 illustrates an uplink TDoA scheme (one way ranging (OWR)). Part (c) of FIG. 3 illustrates a downlink TDoA scheme (OWR).

The TWR scheme corresponds to a method in which the UWB devices exchange ranging messages therebetween to calculate the time of flight (ToF) and determine the location of the UWB device based thereon. The uplink TDoA scheme is a method in which TDoA anchors receive a ranging message transmitted from the UWB device (tag), calculate the TDoA and, based thereupon, determine the location of the UWB device and corresponds to one of OWR schemes. The downlink TDoA method is a method in which the UWB device (UWB tag) receives the ranging messages transmitted from the UWB anchors, calculates the TDoA and, based thereupon, determines the location of the UWB device and corresponds to one of the OWR schemes.

Referring to part (a) of FIG. 3, the user's UWB device 320a may perform ranging through a ranging exchange using at least one UWB anchor 310a and a plurality of ranging messages. The scheme of the TWR of part (a) of FIG. 3 may follow the scheme defined in IEEE 802.15.4/4z. As shown in part (a) of FIG. 3, the TWR may be easily installed because synchronization or networking is not required between UWB anchors, but has a disadvantage in that the number of users (UEs) is limited.

Referring to part (b) of FIG. 3, the user's UWB device 320b may transmit (broadcast) ranging messages to at least one UWB anchor 310b, and at least one UWB anchor 310b may identify the location of the UWB device 320b based on the TDoA when the ranging messages are received. The uplink TDoA (OWR) as shown in part (b) of FIG. 3 has the advantage of reducing power consumption in the UE, but has disadvantages, such as difficulty in installation due to the need for synchronization or networking between UWB anchors, privacy issues arising as the system operator is aware of the locations of all the users, and limit to the number of users (UEs).

Referring to part (c) of FIG. 3, the user's UWB device 320c may receive (sniff) the ranging messages that at least one UWB anchor 310c transmits/receives therebetween and identify its location. The downlink TDoA (OWR) as shown in part (c) of FIG. 3 has such advantages such as no limit to the number of UEs (scalability), no privacy issues unlike in uplink TDoA, no need for synchronization or networking between UWB anchors and ease of installation, possibility that the UD itself can calculate its location, and possibility of enhanced positioning using additional data, e.g., sensor data from the UE. However, the downlink TDoA (OWR) of part (c) of FIG. 3 may consume more power in the UE due to a longer wake-up duration and more calculations as compared with the TWR of part (a) of FIG. 3 and the uplink TDoA (OWR) of part (b) of FIG. 3.

Figure 4:
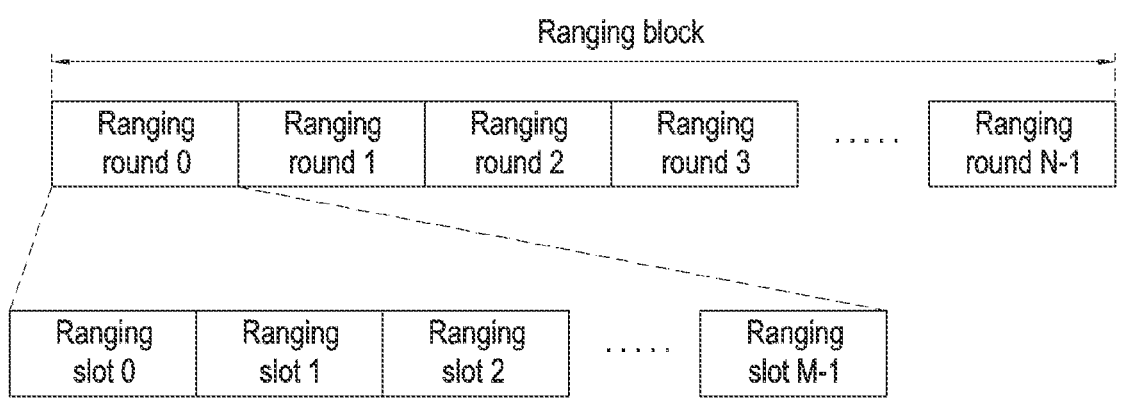
FIG. 4 illustrates a structure of a ranging block and a round used for UWB ranging.

FIG. 4 illustrates a structure of a ranging block and a round used for UWB ranging.

In this disclosure, the ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one ranging frame (RFRAME) (e.g., ranging initiation/reply/final message, etc.).

As shown in FIG. 4, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds. This may be configured through a control message from the controller.

Herein, a ranging block, a ranging round, and a ranging slot may be abbreviated as a block, a round, and a slot.

Described below is a scheme for providing DL-TDoA localization capable of addressing the disadvantages, in terms of power consumption, while maintaining the advantages of the downlink TDoA.

Figure 5:
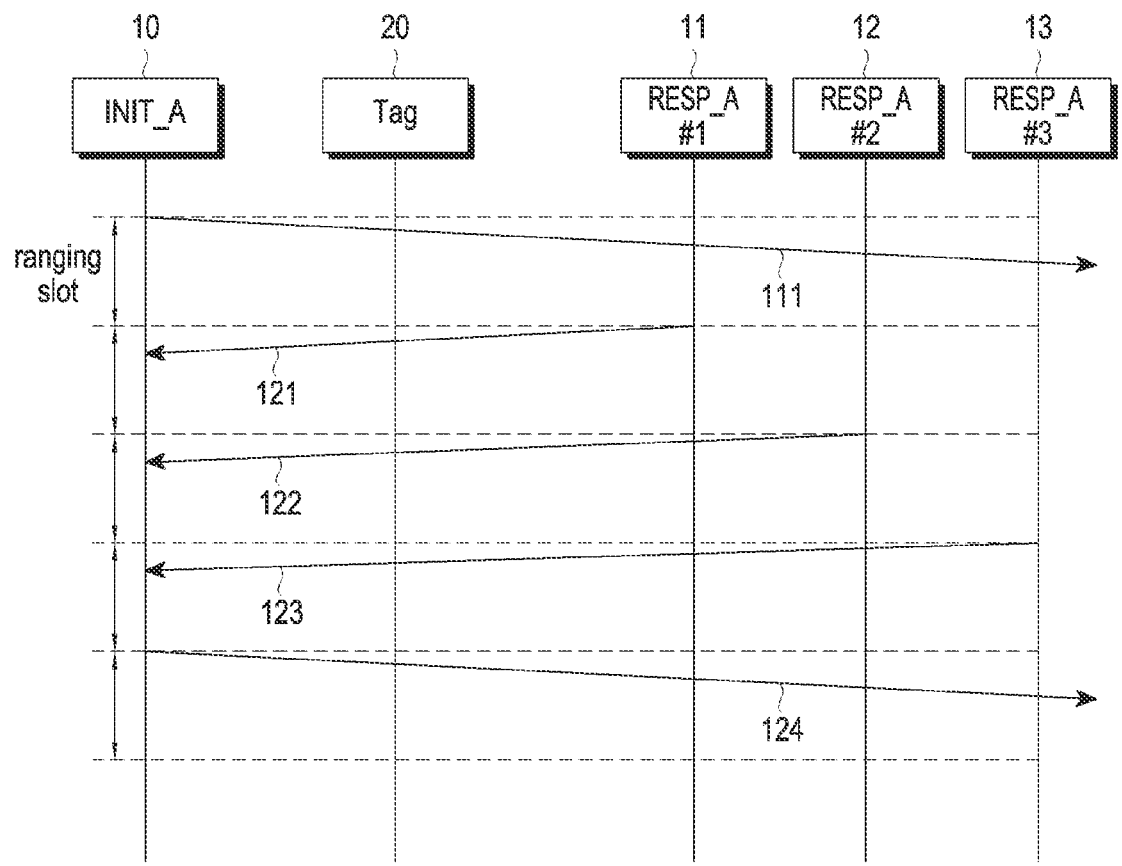
FIG. 5 illustrates a method for a UWB device to perform UWB ranging in a DL-TDoA scheme according to an embodiment.

FIG. 5 illustrates a method for a UWB device to perform UWB ranging in a DL-TDoA scheme according to an embodiment.

Herein, the initiator anchor may be referred to as an initiator DT-anchor, an initiator anchor device, an initiator UWB anchor, or an initiator UWB anchor device. Also, the responder anchor may be referred to as a responder DT-anchor, a responder anchor device, a responder UWB anchor, or a responder UWB anchor device. Further, the user's UWB device playing a tag role may be referred to as a UE, DT-tag or a tag device.

The embodiment of FIG. 5 assumes that the user's UWB device (e.g., mobile device) 20 (Tag) operates as a tag (tag device). It is also assumed that one initiator anchor 10 (INT_A) and three responder anchors 11, 12, and 13 (RESP_A#1, #2, #3) operate as UWB anchors (anchor devices).

However, the embodiment is not limited thereto, and the number of initiator anchors and responder anchors may be varied.

The initiator anchor 10 is a device that controls ranging between a plurality of anchor devices and a UE (tag device).

First, in operation 111, the initiator anchor 10 may initiate TDoA by broadcasting a downlink TDoA initiation message (initiator DL-TDoA Message, initiator DTM) based on scheduling information. The initiator DTM may include scheduling information for each responder anchor in order to transmit the response DTM in the allocated ranging slot. Herein, the initiator DTM may be referred to as poll DTM, or a poll message.

As an embodiment, when the time when the initiator DTM is transmitted from the initiator anchor 10 is 0, the time when the initiator DTM arrives at the UWB device 20 is based on a/c, with a being the distance between the initiator anchor 10 and the UWB device 20, and c being the signal transmission speed. The time when the initiator DTM arrives at the first responder anchor 11 may be 1/c. In 1/c, 1 may be the distance between the initiator anchor 10 and the first responder anchor 11, and c may be the signal transmission speed.

All of the responder anchors 11, 12, and 13 may refer to the scheduling information in the initiator DTM to thereby determine whether to transmit a TDoA response message (TDoA response message, responder DTM) and the slot used to transmit a responder DTM. The responder DTM may be referred to as a response message.

In operation 121, the first responder anchor 11 receiving the initiator DTM may broadcast the responder DTM based on the scheduling information, with $\beta$ denoting the reply time required until the first responder anchor 11 receives the initiator DTM and broadcasts the responder DTM, which is a response to the initiator DTM. The responder DTM may include information about reply time $\beta$.

When the time when the responder DTM is transmitted from the first responder anchor 11 is $1/c+\beta$, the time when the responder DTM arrives at the UWB device 20 may be $1/c+\beta+b/c$, with b being the distance between the first responder anchor 11 and the UWB device 20, and c being the signal transmission speed. Further, the time when the responder DTM arrives at the initiator anchor 10 may be $1/c+\beta+1/c=21/c+\beta$.

In operation 124, the initiator anchor 10 receiving the responder DTM may terminate the TDoA by transmitting a TDoA final message (final DTM), with $\gamma$ denoting the reply time required for the initiator anchor 10 to receive the responder DTM and broadcast the final DTM. The final DTM may include information about reply time $\gamma$. The final DTM may be referred to as a final message.

When the time when the final DTM is transmitted from the initiator anchor 10 is $21/c+\beta+\gamma$, the time when the final DTM arrives at the UWB device 20 may be $21/c+\beta+\gamma+a/c$. Further, the time when the final DTM arrives at the first responder anchor 11 may be $21/c+\beta+\gamma+1/c=31/c+\beta$.

The UWB device 20 may receive the exchanged Poll DTM, Response DTMs and Final DTM, and may calculate TDoA values based on the information included in the message and the reception timestamp. The tag device 520 may obtain (or estimate) its location using the calculated TDoA values. As illustrated in FIG. 5, the UWB device 20 may overhear (or sniff) the broadcast initiator DTM, responder DTM, and final DTM and obtain (find out) the TDoA curve. The UWB device 20 may obtain a TDoA result by repeating the calculation process, as shown in Equation (1), below, on the signals received from three or more anchor devices. The UWB device 20 may obtain relative positions to the anchor devices based on the TDoA result.

The UWB device 20 may obtain the location of the UWB device 20 (e.g., the location of the UWB device 20 in the room) from the TDoA result. The UWB device 20 may identify each anchor device related to the message by the MAC address information included in the message.

A specific calculation process for deriving the distance difference b-a between the distance between the initiator anchor 11 and the UWB device 20 and the distance between the first responder anchor 11 and the UWB device 20 from α'−δ'=2(b−a)/c+β−γcreated based on the time values measured by the UWB device 20 is provided by Equation (1), below.

$$\alpha' - \delta' = (\iota + b - a)/C + \beta - (\iota + a - b)/C \quad (1)$$
$$-\gamma = 2(b-a)/C + \beta - \gamma$$
$$\rightarrow b - a = (\alpha' - \delta' - (\beta - \gamma)) * C/2$$
$$\rightarrow b - a = \left((\alpha - \delta) * \frac{\tau + \gamma}{\alpha + \delta} - (\beta - \gamma)\right) * C/2$$

The above-described DL-TDoA operation between the initiator anchor 10, the first responder anchor 11 and the UWB device 20 may apply likewise between the initiator anchor 10, the second responder anchor 12/the third responder anchor 13 and the UWB device 20.

For example, in operation 111, the initiator anchor 10 may broadcast an initiator DTM. In operations 122/123, the second responder anchor 12/third responder anchor 13 may broadcast the responder DTMs. In operation 124, the initiator anchor 10 may broadcast the final DTM. The UWB device 20 may overhear the broadcast initiator DTM, responder DTM, and final DTM to obtain a TDoA result. Based on this, the distance difference from the initiator anchor 11 and the second responder anchor 12 or the UWB device 20 of the second responder anchor 13 may be derived.

Figure 6:
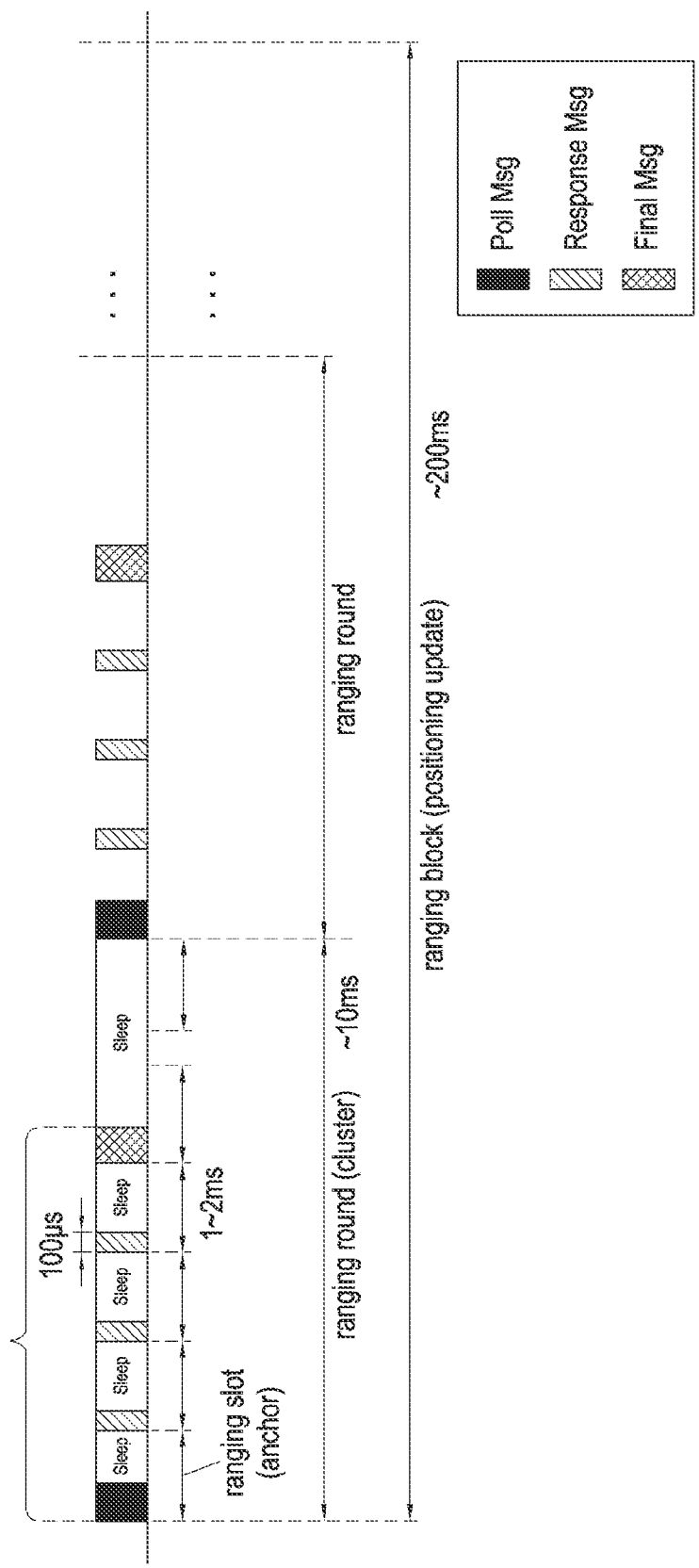
FIG. 6 illustrates a ranging block structure for a downlink TDoA scheme according to an embodiment.

FIG. 6 illustrates a ranging block structure for a downlink TDoA scheme according to an embodiment.

The downlink TDoA scheme of FIG. 6 may be, e.g., the downlink TDoA scheme of FIG. 5.

Referring to FIG. 6, the ranging block may include a plurality of ranging rounds.

As an embodiment, the ranging block may include a plurality of ranging rounds allocated for each cluster. For example, when n number of clusters are deployed, the ranging block may include a first ranging round allocated for a first cluster, a second ranging round allocated for a second cluster, . . . , and an nth ranging round allocated for an nth cluster. According to an embodiment, a plurality of ranging rounds may be allocated to one cluster, or one ranging round may be allocated to a plurality of clusters.

As described above, cluster is a set of UWB anchors covering a specific area. The cluster may be composed of an initiator UWB anchor and responder UWB anchors responding thereto. The cluster area may be a space formed by the UWB anchors constituting the cluster. To support the positioning service for a wide area, a plurality of clusters may be configured to provide the positioning service to the UE. In this disclosure, a cluster is also referred to as a cell, and the operation of the cluster may be understood as the operation of anchor(s) belonging to the cluster.

An example of a deployment of clusters is described below with reference to FIG. 7.

A ranging round may include a plurality of ranging slots.

In an embodiment, the ranging round may include a plurality of ranging slots allocated for each ranging message transmitted by the UWB anchors belonging to the cluster associated with the ranging round. If the first cluster includes one initiator anchor and three responder anchors, the ranging round for the first cluster may include a first ranging slot (for example, ranging slot index 0) allocated for transmission/reception of the poll message of the initiator anchor included in the first cluster, a second ranging slot allocated for transmission/reception of the response message of the first responder anchor, a third ranging slot allocated for transmission/reception of the response message of the second responder anchor, a fourth ranging slot allocated for transmission/reception of the response message of the third responder anchor, and a fifth ranging slot allocated for transmission/reception of the final message of the initiator anchor. A period other than the duration during which an associated ranging message is transmitted in the corresponding ranging slot may be a sleep period.

In this scheme, ranging slots may be allocated to the ranging round for each cluster.

Through the ranging block structure illustrated in FIG. 6, each cluster may transmit/receive its own ranging messages (e.g., poll/response/final message (DTM)) once via own ranging round in a ranging block, and the UE may receive these ranging messages and calculate its location. This operation may be repeated for each ranging block. Thus, the location of the UE may be updated in the period of the ranging block. Accordingly, in the embodiment of FIG. 6, the ranging block may correspond to a period for positioning update.

Figure 7:
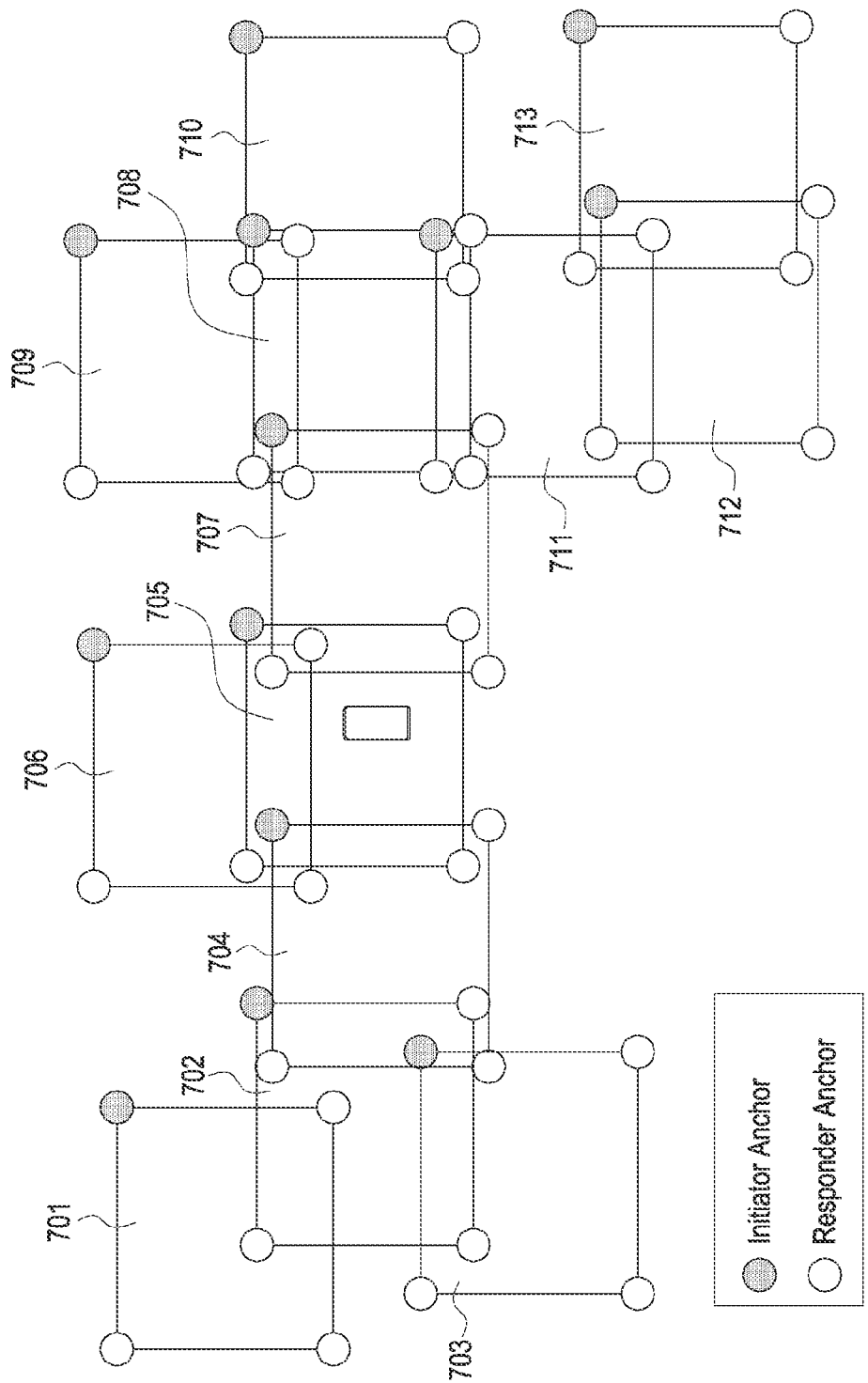
FIG. 7 illustrates cluster deployment according to an embodiment.

FIG. 7 illustrates cluster deployment according to an embodiment.

In the embodiment of FIG. 7, it is assumed that thirteen (13) clusters 701, 702, . . . , 713 are deployed in corresponding areas, and each cluster includes one initiator anchor and three responder anchors. However, the present disclosure is not limited thereto, and the number of clusters may vary, and the number of anchors included in each cluster may also vary.

Referring to FIG. 7, the area defined by one cluster may overlap an area defined by other neighboring cluster(s). For example, as shown, the area covered by the second cluster 702 may over the area covered by the first cluster 701, the area covered by the third cluster 703, and the area covered by the fourth cluster 704. However, this is merely an example, and the clusters may be deployed so that the area defined by one cluster does not overlap the area defined by another neighboring cluster, e.g., cluster 705, cluster 706, cluster 707, cluster 708, cluster 709, cluster 710, cluster 711, cluster 712, and/or cluster 713.

When using the ranging block structure shown in FIG. 6, each cluster may transmit/receive its own ranging messages once in its own ranging round in the ranging block, and the UE may overhear these ranging messages to calculate its location.

One UWB anchor may belong to a plurality of adjacent clusters and, in each cluster, operate as either an initiator UWB anchor or a responder UWB anchor.

Figure 8:
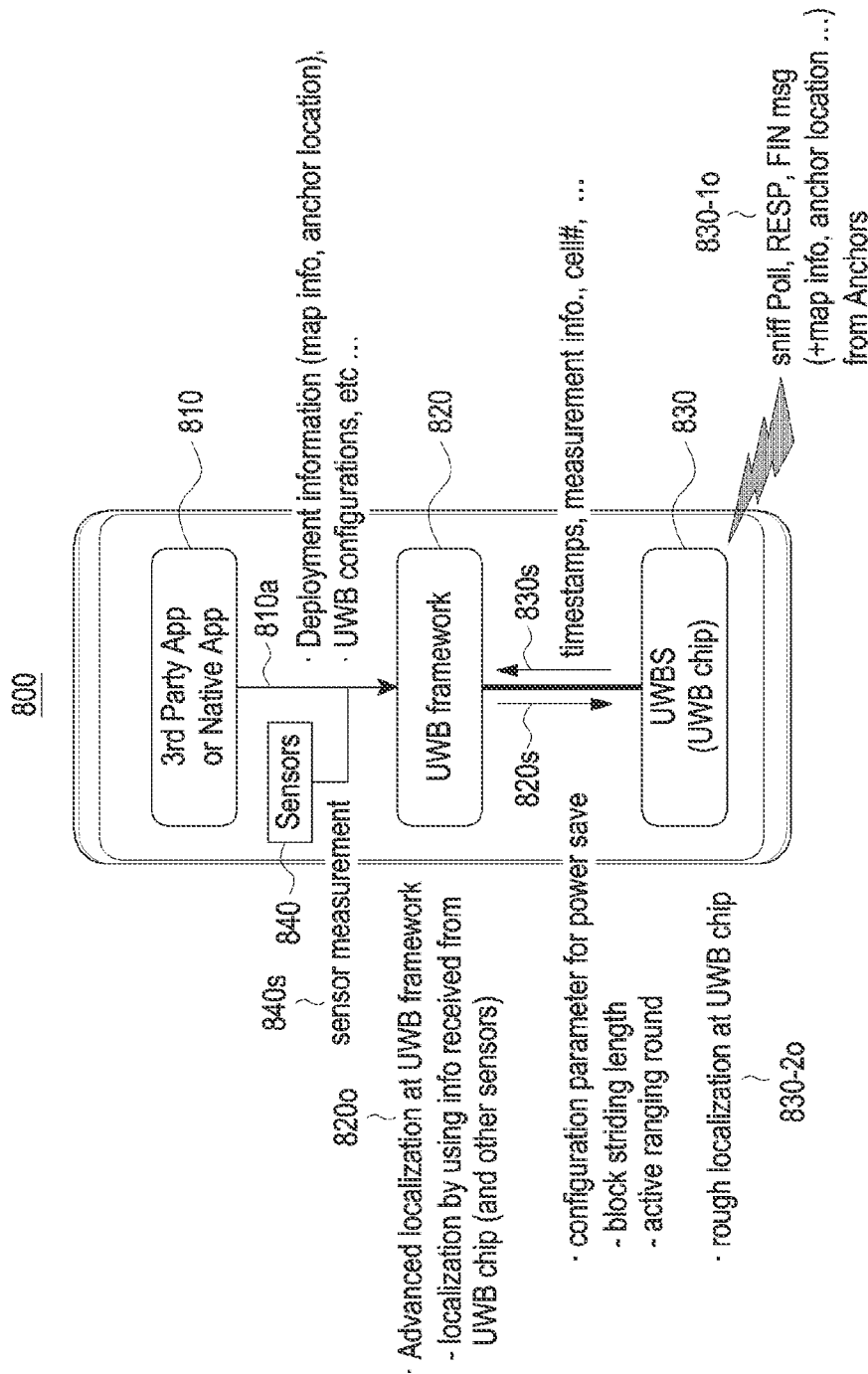
FIG. 8 illustrates operation and signal flow of a UWB device for DL-TDoA localization according to an embodiment.

FIG. 8 illustrates operation and signal flow of a UWB device for DL-TDoA localization according to an embodiment.

The UWB device 800 of the embodiment of FIG. 8 may be, e.g., an example of the UWB device of FIG. 1. The UWB device 800 of the embodiment of FIG. 8 may serve as a tag for DL-TDoA localization.

Referring to FIG. 8, the UWB device 800 may include at least one application 810, a UWB framework 820, a UWBS 830, and/or at least one sensor 840. The UWBS 830 may be a UWB chip.

The operation and signal flow of the least one application 810, the UWB framework 820, the UWBS 830, and the at least one sensor 840 are described below.

(1) At least one application 810:

The at least one application 810 may include a 3rd party application and/or a native application. The native application may be a UWB-enabled application.

The application 810 may transfer a first signal 810a to the UWB framework 820. The first signal 810a may include deployment information and/or UWB configuration information. The deployment information may include map information about the corresponding area and/or location information about the anchor (e.g., UWB anchor) deployed in the corresponding area. The location information about the anchor may include information about a relative location from a specific location of the corresponding area and/or information about an absolute location including, e.g., latitude and longitude. The UWB configuration information may include at least one of the UWB channel number for the UWBS to perform downlink TDoA localization, preamble CI, STS index value for generating the STS, service identifier, or key information for data encryption/decryption.

The application 810 may provide a UWB service. For example, the application 810 may provide a UWB service based on DL-TDoA localization.

(2) UWB framework 820:

The UWB framework 820 may receive a first signal 810a from the application 810, a third signal 830s from the UWBS 830, and/or a fourth signal 840s from at least one sensor 840. As described above, the first signal 810a may include deployment information and/or UWB configuration information. The UWB device 800 may obtain additional information through an external BLE device through the BLE OOB connector included in the UWB framework 820. The BLE OOB connector may exchange information with the external BLE device through BLE pairing and obtain information by receiving the BLE advertisement message. The information may be deployment information and/or UWB configuration information included in the first signal 810a.

The third signal 830s may include information about transmission/reception timestamp(s) of ranging messages for DL-TDoA localization, measurement information (ranging measurement information), cluster information (e.g., cluster (cell)) number (#) information) and/or UWB anchor information (e.g., UWB anchor identifier, UWB anchor MAC address, UWB anchor location information).

The location information of the UWB anchor is reported by the DT-anchor through the anchor location field of the Poll DTM or Response DTM, and may be obtained by the DT-tag.

The measurement information may include received signal strength information for DTM, information about the reply time of the response message (responder reply rime information) and/or information about the reply time of the final message (initiator reply time information). Responder Reply Time information is reported through the reply time list field of Final DTM by the initiator DT-anchor, and may be acquired by the DT-tag. The initiator reply time information is reported through the responder reply time list field of the Response DTM by the responder DT-anchor(s), and may be obtained by the DT-tag.

The received signal strength information for the DTM may be a Received Signal Strength Indicator (RSSI) measured by the DT-Tag when the DTM is received.

The fourth signal 840s may include sensor measurement information (sensing data). The sensor measurement information may include information about the acceleration on the x, y, and z axes of the UE measured by an accelerometer and/or information about the angular velocity on the x, y, and z axes of the UE measured by the inertial sensor. The information obtained through the fourth signal 840s may be used when the UWB framework 820 or the application 810 estimates the location and motion of the UE.

The UWB framework 820 may perform a first localization operation 820o based on information included in at least one received signal. For example, the UWB framework 820 may perform localization (DL-TDoA localization) based on the information included in the third signal 830s received from the USBS 830. In this case, the UWB framework 820 may perform DL-TDoA localization by further using the information included in the fourth signal 840s received from the at least one sensor 840. In this case, as compared to when only information obtained from the USBS 830 is used, the location (coordinates) and motion of the UWB device 800 may be predicted using the additionally obtained sensing data so that more advanced or accurate localization may be performed. Herein, the localization performed by the UWB framework 820 may be referred to as advanced localization or first localization.

The UWB framework 820 may transfer the second signal 820s to the UWBS 830. The second signal 820s may include configuration information (parameter) for power saving. For example, the second signal 820s may include block striding length information for power saving in units of ranging blocks and/or information (e.g., active ranging round bitmap) about the active ranging round for power saving in units of ranging rounds.

(3) UWBS 830:

The UWBS 830 receives at least one ranging message for DL-TDoA localization transmitted by at least one anchor (UWB anchor). For example, the UWBS 830 may perform an operation 830-1o of sniffing the poll message, the response message, and the final message from the initiator anchor and at least one responder anchor. The UWBS 830 may be activated in a configured active ranging round to receive DTM(s) from the DT-anchor(s).

The UWBS 830 performs a second localization operation 830-2o based on the information included in the received at least one ranging message. In the second localization operation 830-2o by the UWBS 830, the available information is limited as compared to the UWB framework 820, which is an upper layer (e.g., it is difficult to use the sensing data), so that rough localization is possible as compared to the UWB framework 820. Localization performed by the UWBS 830 may be referred to as rough localization or second localization.

(4) At least one sensor 840:

The at least one sensor 840 may sense the surrounding environment to obtain sensing data, and the at least one sensor 840 may include, e.g., an accelerometer and/or an inertial sensor.

The at least one sensor 840 may transfer the fourth signal 840s including sensing data to the UWB framework 820. The transferred sensing data may be used for DL-TDoA localization in the UWB framework 820.

Figure 9:
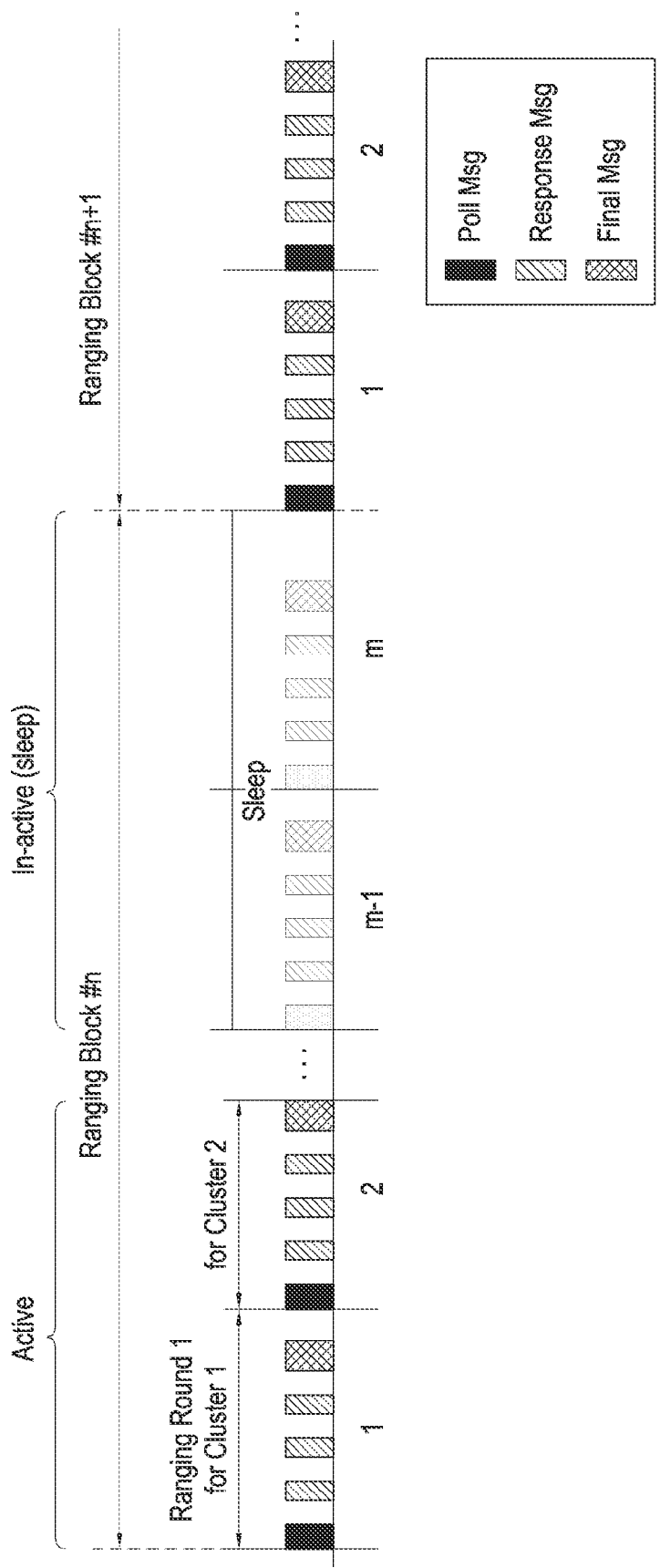
FIG. 9 illustrates a ranging block structure including an active ranging round and an inactive ranging round for DL-TDoA localization, according to an embodiment.

FIG. 9 illustrates a ranging block structure including an active ranging round and an inactive ranging round for DL-TDoA localization, according to an embodiment.

The ranging block structure of FIG. 9 provides an example of the ranging block structure of FIG. 6.

The ranging block may include a plurality of ranging rounds allocated for each cluster. For example, as shown, ranging block #n may include a first ranging round allocated for cluster 1, a second ranging round allocated for cluster 2, . . . , an m-lth ranging round allocated for cluster m-1, and an mth ranging round allocated for cluster m. Ranging block #n+1, which is the next ranging block of ranging block #n, may include a first ranging round allocated for cluster 1, a second ranging round allocated for cluster 2, . . . , an m-1 th ranging round allocated for cluster m-1, and an mth ranging round allocated for cluster m.

Each ranging round may include a plurality of ranging slots allocated for each ranging message transmitted by UWB anchors included in the cluster associated with the ranging round. For example, as shown, the first ranging round for cluster may include a first ranging slot for transmission of the poll message of the initiator anchor of cluster 1, a second ranging slot for transmission of the first response message of the first responder anchor of cluster 1, a third ranging slot for transmission of the second response message of the second responder anchor of cluster 1, a fourth ranging slot for transmission of the third response message of the third responder anchor of cluster 1, and a fifth ranging slot for transmission of the final message of the initiator anchor of cluster 1. The remaining ranging rounds of the corresponding ranging block may also include a first ranging slot for transmission of the poll message of the initiator anchor of the corresponding cluster, a second ranging slot for transmission of the first response message of the first responder anchor of the corresponding cluster, a third ranging slot for transmission of the second response message of the second responder anchor of the corresponding cluster, a fourth ranging slot for transmission of the third response message of the third responder anchor of the corresponding cluster, and a fifth ranging slot for transmission of the final message of the initiator anchor of the corresponding cluster.

As such, when all of the messages (signals) of the UWB anchors of each cluster, time-divisioned and transmitted, are overheard and processed, power consumption increases. Even when the user's UWB device does not overhear the signals of UWB anchors belonging to the cluster far away from the UWB device, the localization performance may not be affected. Therefore, it is needed to achieve the power efficiency for the UWB device by receiving only messages essential for localization while turning off the UWBS or allowing it to operate in low power mode in the remaining time.

For example, the ranging messages from the UWB anchors in clusters 1 and 2 may be essential for DL-TDoA localization, but the ranging messages from clusters m-1 and m may not be essential for DL-TDoA localization. For example, clusters 1 and 2 correspond to clusters positioned close to the UWB device, so that the UWB signals of clusters 1 and 2 may be essential for localization. Clusters m-1 and m correspond to clusters far away from UWB devices, so that the UWB signals of clusters m-1 and m may not be essential for localization.

In this case, as shown, the UWB device may set the UWBS (UWB module) to the active state during the ranging rounds for clusters 1 and 2 to receive the ranging messages from the UWB anchors of clusters 1 and 2 and, during the ranging rounds for clusters m-1 and m, set the UWBS (UWB module) to the inactive state or sleep state (low power mode or turned-off state) to refrain from receiving the ranging messages from the UWB anchors of clusters m-1 and m. Thus, power consumption of the UWB device is reduced.

The ranging round in the active state may be referred to as an active ranging round or an active round. The ranging round in the sleep state may be referred to as a sleep ranging round, an inactive ranging round, a sleep round, or an inactive round. FIG. 9 illustrates an embodiment in which the entire period of a specific ranging round is set to the sleep state, but this is merely an example. Only a partial period of the specific ranging round may be set to the sleep state. For example, the UWB device may set the transmission period of the poll Msg of cluster m-1 to the active state and set the transmission period of response Msg and final Msg to the sleep state.

As such, power consumption for performing DL-TDoA localization may be reduced by setting the entire or partial period of at least one ranging round to the sleep state as necessary.

Described below is a method for the UWB device to perform an operation for power saving of DL-TDoA localization. The power saving operation may include an operation for processing the UWB device to selectively overhear only a portion necessary for localization among the plurality of ranging rounds in the ranging block. The power saving operation may be referred to as a low power DL-TDoA localization operation.

A first embodiment in which the upper layer (e.g., UWB framework or application layer) of the UWBS (UWB chip) controls the power saving operation is described with reference to FIGS. 10 to 14. A second embodiment for controlling the power saving operation in the UWBS is described with reference to FIGS. 16 to 20.

First Embodiment (Power Saving Operation According to Control of the Upper Layer Control of the UWBS)

In the first embodiment, the power saving operation may be controlled by the upper layer of the UWBS, and the UWBS may simply operate based on the command transferred by the upper layer. As such, controlling the power saving operation at the upper layer level allows for more accurate processing by way of more information (e.g., sensor information) as compared to controlling at the UWBS level. Thus, cluster filtering based on more accurate prediction of the user's location and movement direction may be performed.

Figure 10:
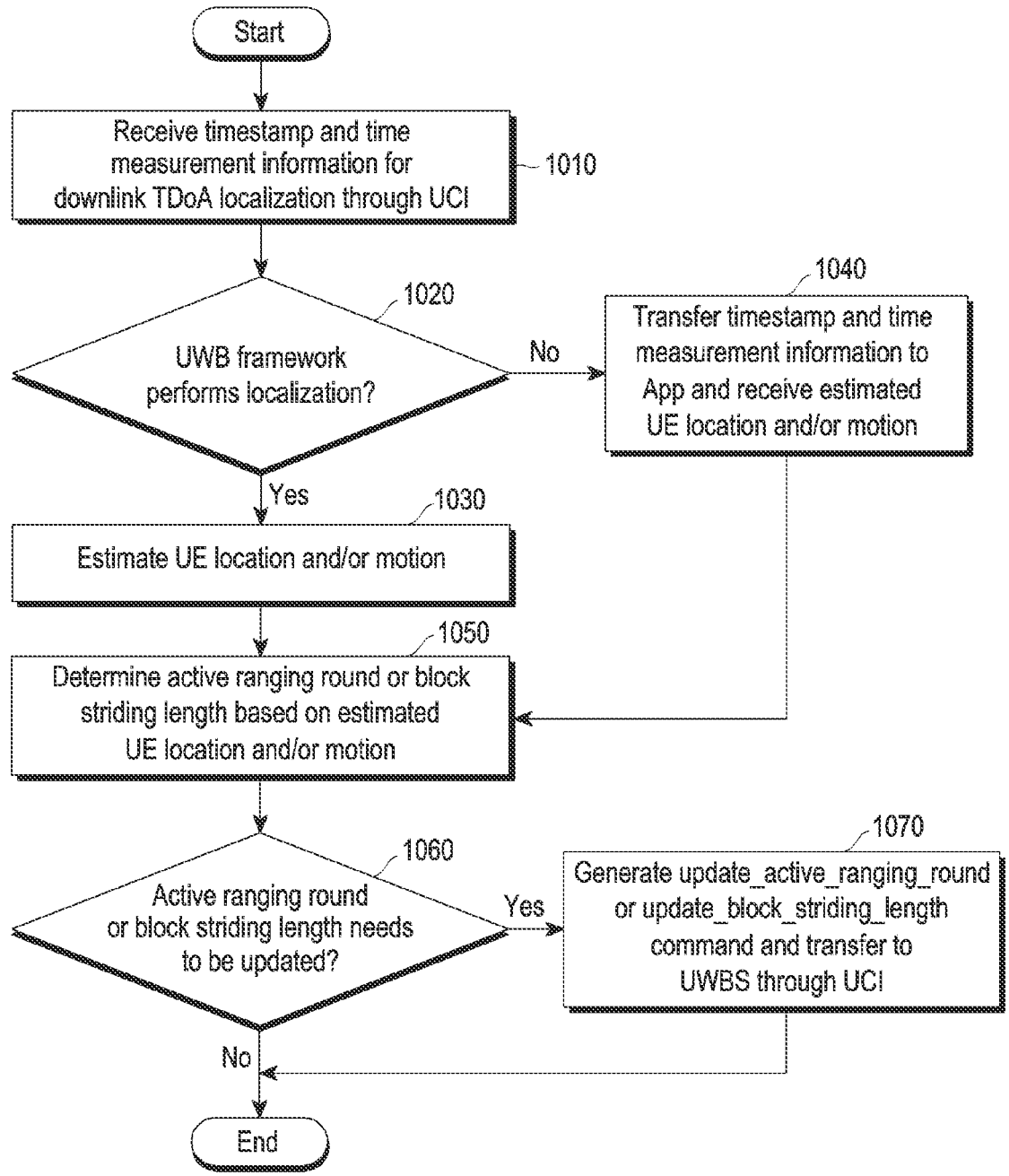
FIG. 10 illustrates a method in which a UWB device performs a power saving operation according to a first embodiment.

FIG. 10 illustrates a method in which a UWB device performs a power saving operation according to an embodiment.

The method for the embodiment of FIG. 10 corresponds to an example of the first embodiment in which the power saving operation is controlled by the upper layer of the UWBS.

The operation of the UWB device of FIG. 10 corresponds to the operation of the UWB framework of the UWB device. The operation of the UWB framework may be understood as the operation of a processor (e.g., an application processor) including the UWB framework or the UWB device including the UWB framework.

Referring to FIG. 10, the UWB framework may obtain information for DL-TDoA localization. For example, the UWB framework may receive timestamp and time measurement information (measurement information) for DL-TDoA localization from the UWBS through the UCI (operation 1010). The UWB framework may further obtain sensing information (data) for DL-TDoA localization.

The UWB framework may identify whether the UWB framework performs localization (DL-TDoA localization) (operation 1020).

When localization is performed by the UWB framework, the UWB framework may estimate the location and/or motion of the UWB device based on information for DL-TDoA localization (operation 1030).

Alternatively, when localization is not performed by the UWB framework, the UWB framework may transfer information (e.g., timestamp information, measurement information, and/or sensing information) for DL-TDoA localization to the application (APP) and may receive information about the location and/or motion of the UWB device estimated by the application from the application (operation 1040). In this case, the application may estimate the location and/or motion of the UWB device based on the information for DL-TDoA localization.

The UWB framework may determine an active ranging round and/or a block striding length based on the estimated location and/or motion information about the UWB device (operation 1050). A method for determining an active ranging round and/or a block striding length is described below with reference to FIGS. 12 to 14.

The UWB framework may determine whether the active ranging round and/or block striding length needs to be updated (operation 1060).

When the active ranging round and/or block striding length needs to be updated, the UWB framework may generate a command (e.g., update_active_ranging_round command and/or update_block_striding_length command) for updating the active ranging round and/or block striding length, and transfer the command to the UWBS via the UCI (operation 1070). In this case, the UWBS may update the active ranging round or block striding length based on the command. A method for generating and transferring a command for updating the active ranging round and/or block striding length is described below with reference to FIGS. 12 to 14.

Figure 11A:
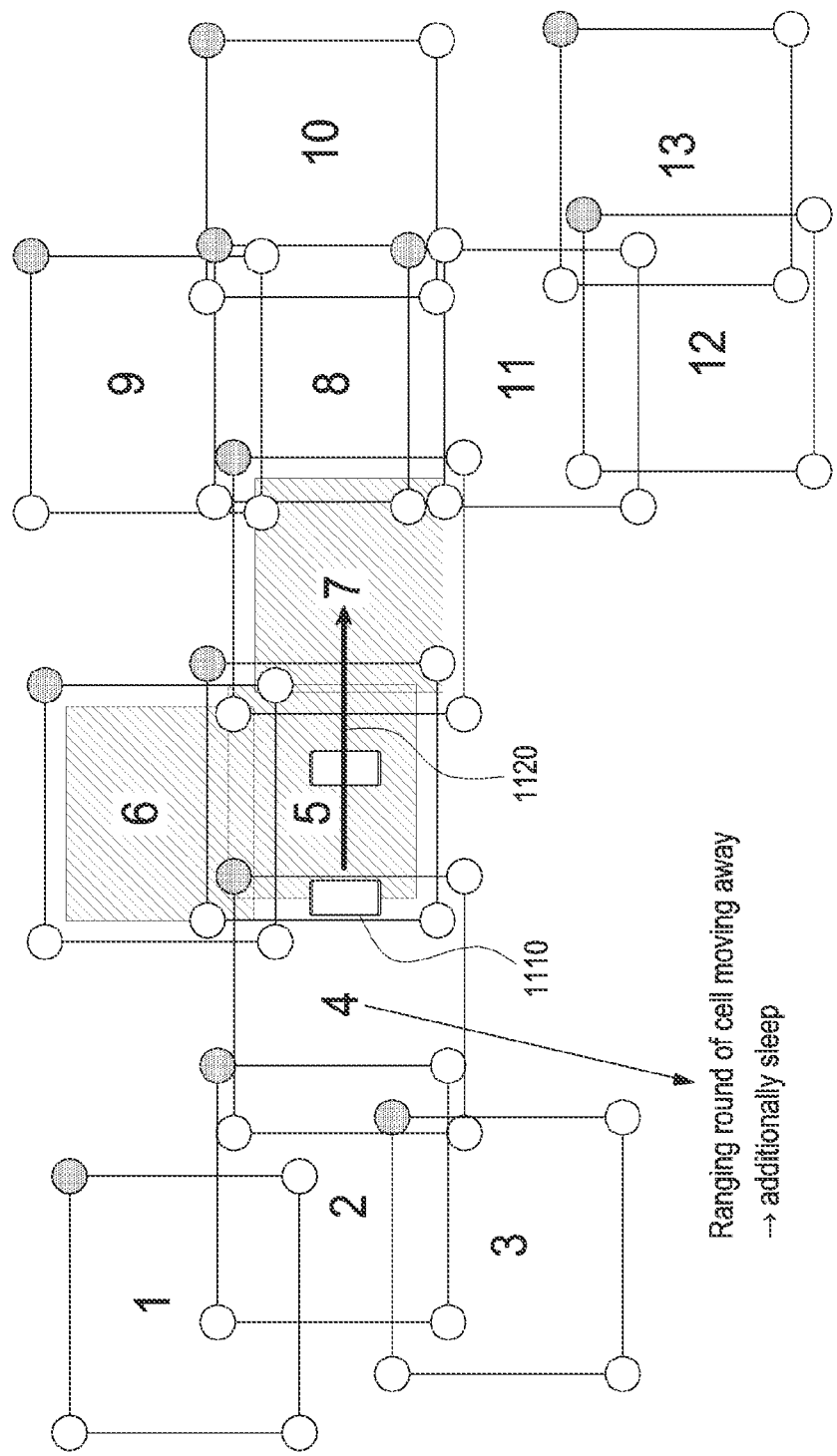
FIGS. 11A and 11B illustrate a method in which a UWB device selects an active ranging round, according to an embodiment.
Figure 11B:
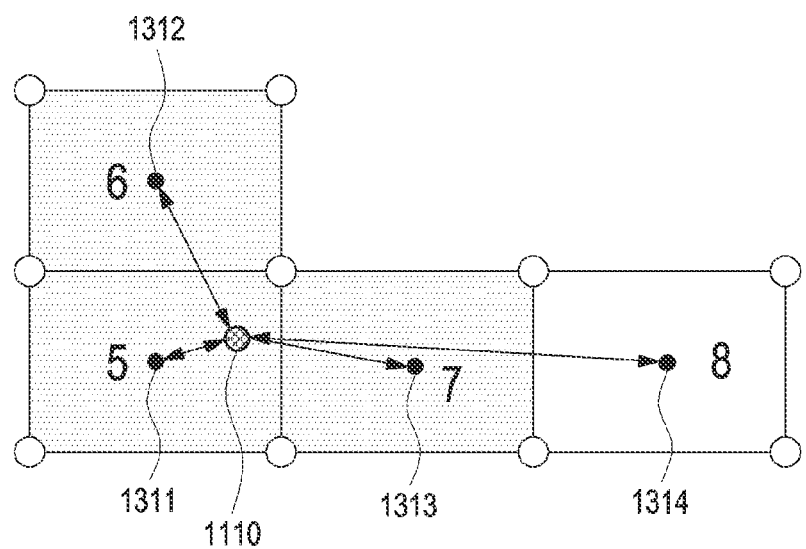

FIGS. 11A and 11B illustrate a method in which a UWB device selects an active ranging round, according to an embodiment.

The embodiment of FIGS. 11A and 11B correspond to an embodiment for estimating the location and moving direction (or motion) of the UWB device and selecting the active ranging round based on the estimated result.

FIG. 11A illustrates an example of a method in which the UWB device excludes the ranging round for a specific cluster from the active ranging round or selects the ranging round as an inactive ranging round based on the location and moving direction. FIG. 11B illustrates an example of a method in which the UWB device selects the ranging round for a specific cluster as the active ranging round based on the location and moving direction.

The UWB device may estimate the current location and moving direction of the UWB device based on the information for DL-TDoA localization. For example, as shown in FIG. 11A, the UWB device may estimate the first location 1110 which is the current location of the UWB device based on the location coordinates calculated based on the ranging messages received from the UWB anchors and estimate the first moving direction 1120 which is the moving direction of the UWB device based on the sensing data received from the sensor(s) (e.g., an accelerometer).

The UWB device may exclude the ranging round of the cluster located in the area getting away from the UWB device moving in the first moving direction 1120, from the active ranging round, based on the estimated first location 1110 and the first moving direction 1120.

When the UWB device is estimated as being in the first location 1110 in the cluster deployment structure as shown in FIG. 11A, the ranging round of at least one cluster adjacent to the first location 1110 may be determined as a candidate active ranging round according to a preset criterion. For example, the UWB device may determine the ranging rounds of clusters 2, 4, 5, 6, 7, and 8 adjacent to the first location 1110 as candidate active ranging rounds. In this case, the UWB device may exclude the ranging rounds of clusters 2 and 4 that move away from the estimated first movement direction 1120 from the active ranging rounds. In other words, the ranging rounds of clusters 2 and 4 may be inactive ranging rounds. In the corresponding ranging round, the UWB device may operate in the inactive state (sleep state).

The UWB device may select the ranging round of the cluster located in the area getting closer to the UWB device moving in the first moving direction 1120, as the active ranging round, based on the estimated first location 1110 and the first moving direction 1120.

In an embodiment, the UWB device may determine whether the ranging round of the corresponding cluster is the active ranging round based on the estimated current location and distance from the cluster. For example, if the distance between the estimated current location and the cluster is greater than or equal to a preset threshold (e.g., distance L), the UWB device may exclude the ranging round of the cluster from the active ranging round. Alternatively, if the estimated distance between the current location and the cluster is less than the preset threshold (e.g., distance L), the UWB device may select the ranging round of the cluster as the active ranging round.

The threshold L may be adjusted according to the speed of the UWB device. For example, if the speed of the UWB device is high, the threshold L may be set to be small and, if the speed of the UWB device is low, the threshold L may be set to be large. Thus, it is possible to prevent the ranging round necessary for downlink TDoA localization from being excluded from the active ranging round by adaptively adjusting the number of active ranging rounds according to the user's moving speed. The speed of the UWB device may be estimated based on the sensing data of the accelerometer.

The distance between the estimated current location and the cluster may be the distance between the estimated current location and a representative value of the cluster, the minimum value of the distance between the estimated current location and each anchor included in the cluster, or the shortest distance between the estimated current location and the nearest side of the cluster.

The representative value of the cluster may be a central value (coordinates) of the cluster, as shown in FIG. 11B. In this case, the UWB device may calculate the distance between the estimated current location 1110 and center values 1311, 1312, 1313, and 1314 of each cluster. The UWB device may select the ranging rounds of clusters for which the calculated distance is less than the preset threshold L (e.g., the ranging rounds of clusters 5, 6, and 7) as active ranging rounds. The UWB device may exclude the ranging rounds of clusters for which the calculated distance is greater than or equal to the preset threshold L (e.g., the ranging round of cluster 8) from active ranging rounds.

The determination for selecting (or excluding) a specific ranging round as/from an active ranging round, determined in the current ranging block, may be applied to the corresponding ranging round of the next ranging block. For example, the determination of selecting a specific ranging round of the current ranging block as an active ranging round may be transferred to the UWBS (UWB chip) through the UCI and be applied to the UWBS from the very next ranging block to the ranging block currently in progress. A method for transferring a command for power saving to the UWBS by the UWB framework is described below with respect to FIGS. 12 to 14.

Figure 12:
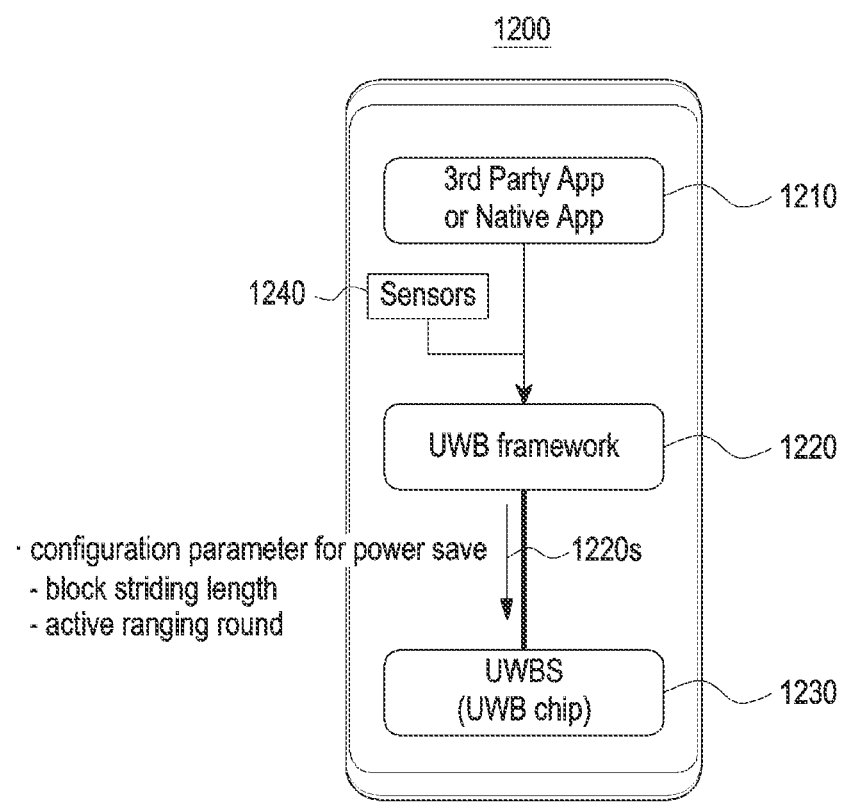
FIG. 12 illustrates a method in which a UWB device sets a parameter for power saving according to an embodiment.

FIG. 12 illustrates a method in which a UWB device sets a parameter for power saving according to an embodiment.

The UWB device of FIG. 12 may be an example of the UWB device of FIG. 8.

Referring to FIG. 12, the UWB device 1200 may include at least one application 1210, a UWB framework 1220, a UWBS 1230, and/or at least one sensor 1240. The UWBS 1230 may be a UWB chip. The operation and signal flow of each component may refer to the description of FIG. 8.

In the embodiment of FIG. 12, the UWB framework 1220 may generate a configuration parameter for power saving of the DL-TDoA localization operation and may transfer the configuration parameter to the UWBS 1230. Further, the UWB framework 1220 may transfer the parameter indicating the session ID of the session (DL-TDoA session) being currently operated for downlink TDoA localization and/or the parameter indicating the number of all of the ranging rounds included in the ranging block to the UWBS 1230.

The UWB framework 1220 may transfer the configuration parameters to the UWBS 1230 through a UCI command. For example, the UWB framework 1220 may transfer the configuration parameter to the UWBS 1230 through a first UCI command (UPDATE_ACTIVE_RANGING_ROUND_CMD). As another example, the UWB framework 1220 may transfer the configuration parameter to the UWBS 1230 through a second UCI command (CORE_SET_CONFIG_CMD). The first UCI command (UPDATE_ACTIVE_RANGING_ROUND_CMD) and the second UCI command (CORE_SET_CONFIG_CMD) are described below with reference to FIGS. 13 and 14, respectively.

The configuration parameter may include a block striding length parameter (information) and/or an active ranging round parameter (information). Details of the active ranging parameter and the block striding length parameter are set forth below.

(1) Active Ranging Round Parameter:

The active ranging round parameter may indicate active ranging round(s). In the active ranging round(s) set by the active ranging round parameter, the UWB device (or the UWBS of the UWB device) may be activated as a DT-tag to receive DTM(s) from the DT-anchor(s).

In an embodiment, the active ranging round parameter may indicate active ranging round(s) in a bitmap scheme. For example, the active ranging round parameter may include a bitmap indicating the index of the active ranging round(s). For example, when the active ranging round parameter is set to '1100000001' (bitmap), the active ranging round parameter may indicate that among the 10 ranging rounds, ranging round Nos. 1, 2, and 10 (or ranging round Nos. 1, 9, and 10) correspond to active ranging rounds and the remaining ranging rounds correspond to inactive ranging rounds. The active ranging round parameter in the bitmap scheme may be referred to as a first active ranging round parameter or an active ranging round bitmap parameter.

In another embodiment, the active ranging round parameter may indicate active ranging round(s) in a list scheme. For example, the active ranging round parameter may include a list indicating the index of the active ranging round(s). For example, when the active ranging round parameter is set to {1,2,10}, the active ranging round parameter may indicate that ranging round Nos. 1, 2, and 10 correspond to active ranging rounds and the remaining ranging rounds correspond to inactive ranging rounds. The active ranging round parameter in the list scheme may be referred to as a first active ranging round parameter or an active ranging round list parameter.

When there is little motion of the UWB device, the UWB device does not need to frequently perform location calculations for DL-TDoA localization. When the UWB device performs the location calculation (update) of every ranging block, unnecessary power consumption occurs although only some ranging rounds of the corresponding ranging block are selected as active rounds while the remaining ranging rounds remain in the inactive state. In other words, turning on/off of overhearing only in units of ranging rounds causes unnecessary power consumption in a specific situation.

Accordingly, a method capable of skipping the location calculation by the UWB device in units of ranging blocks, depending on the situation is provided. In other words, a scheme is provided that is able to turn on/off overhearing in units of ranging blocks as well.

Also provided is a scheme capable of adaptively adjusting the length (number) of ranging blocks to be skipped. For example, the UWB device may identify the degree of motion based on the sensing data of the UWB device. When the degree of motion is less than a threshold, the UWB device may sharply increase the length of the ranging block to be skipped (e.g., increase with a multiplicative function). When the degree of motion is greater than or equal to the threshold, the UWB device may initialize the length of the ranging block to be skipped to a default value (e.g., 1) or sharply decrease it.

The length of the ranging block to be skipped may be set and adjusted by a block striding length parameter to be described below.

(2) Block Striding Length Parameter:

The block striding length parameter may indicate the number of ranging blocks to be skipped. In the ranging round to be skipped, the UWB device may operate in the inactive state (sleep state). In other words, the UWB device does not overhear the ranging messages from the UWB anchors in the skipped ranging block.

For example, when the block striding length parameter is set to 3 (e.g., 0x03), the block striding length parameter may indicate that three ranging blocks are to be skipped. In this case, the UWB device may operate in the active state in one ranging block (current ranging block), in the inactive state in the next three ranging blocks, and in the active state in the fourth ranging block. As an embodiment, the next three ranging blocks may be three ranging blocks immediately following the ranging block (current ranging block) in which the block striding length parameter is received.

As another example, when the block striding length parameter is set to 3 (e.g., 0x03), the block striding length parameter may indicate that among the three ranging blocks, two ranging blocks are to be skipped. In this case, the UWB device may operate in the active state in one of the three ranging blocks and in the inactive state in the two ranging blocks. The two ranging blocks may be two ranging blocks immediately following the ranging block (current ranging block) in which the block striding length parameter is received.

Through this block striding length parameter, the number of blocks to be skipped by the DT-tag may be set between two active raging blocks (ranging blocks in which the DT-tag receives the DTM).

As an embodiment, the number of ranging blocks to be skipped may be determined by the DT-tag itself without negotiation through the DT-anchor or OOB mechanism.

FIG. 13 illustrates a first UCI command including an active ranging round parameter and a block striding length parameter according to an embodiment.

The first UCI command of FIG. 13 may be a UCI command newly defined for a low-power DL-TDoA localization operation. The first UCI command of FIG. 13 may be referred to as UPDATE_ACTIVE_RANGING_ROUND_CMD.

The first UCI command of FIG. 13 corresponds to a command transferred from the UWB framework to the UWBS to set parameters for power saving on the UWBS. The UWBS may perform a predetermined operation according to the first UCI command.

Referring to FIG. 13, the first UWB command may include the Session ID parameter indicating the ID of the session (DL-TDoA session) during which the ranging message, i.e., anchor message, is being received for downlink TDoA localization, the parameter, e.g., number of ranging rounds, indicating the number of ranging rounds in the ranging block, the active ranging round parameter, and/or the block striding length parameter.

The Session ID parameter may indicate an ID of a DL-TDoA session for which an active ranging round needs to be activated.

The active ranging round of the active ranging round parameter and the block striding length of the block striding length parameter may be determined by the UWB framework or application layer, which is an upper layer of UWBS, as described above.

The active ranging round parameter may be one of an active ranging round bitmap parameter or an active ranging round list parameter.

The active ranging round bitmap parameter may indicate the ranging round to operate as the active ranging round, in a bitmap. For example, when the active ranging round bitmap parameter is set to '10110000 . . . 00,' the active ranging round bitmap parameter may indicate that ranging rounds Nos. 1, 3, and 4 correspond to active rounds, and the remaining rounds correspond to inactive rounds. In this case, the UWB device may operate in the active state in the first, third, and fourth ranging rounds and in the inactive state (sleep state) in the remaining rounds. The setting of the active ranging round bitmap parameter may be applied to the UWBS in the current ranging block in which the active ranging round bitmap parameter is received or in a next ranging block to the current ranging block.

The active ranging round list parameter may represent the ranging rounds to operate as active ranging rounds as a list of integers. For example, when the active ranging round list parameter is set to '0x010304,' the active ranging round list parameter may indicate that ranging rounds Nos. 1, 3, and 4 correspond to active rounds, and the remaining rounds correspond to inactive rounds. In this case, the UWB device may operate in the active state in the first, third, and fourth ranging rounds and in the inactive state (sleep state) in the remaining rounds. As an embodiment, the setting of the active ranging round list parameter may be applied to the UWBS in the current ranging block in which the active ranging round list parameter is received or in a next ranging block to the current ranging block.

The block striding length parameter may indicate the number of ranging blocks to be skipped. For example, when the block striding length parameter is set to 0x02, the block striding length parameter may indicate that two ranging blocks are to be skipped. In this case, the UWB device may operate in the active state in one ranging block (overhears the ranging messages of the UWB anchors) skip the following two ranging blocks (does not overhear the ranging messages of the UWB anchors), and operate in the active state in the next third ranging block. As an embodiment, the setting of the block striding length parameter may be applied to the UWBS in the current ranging block in which the block striding length parameter is received or in a next ranging block to the current ranging block.

In the embodiment of FIG. 13, each of the above-described parameters of the first UCI command may include a value of Tag identifiers (IDs), but is not limited thereto. The Tag identifier (ID) values for all or some of the above-described parameters of the first UCI command may not be used.

FIG. 14 illustrates a second UCI command including an active ranging round parameter according to an embodiment.

The second UCI command of FIG. 14 may be referred to as CORE_SET_CONFIG_CMD.

The second UCI command of FIG. 14 corresponds to the UCI command transferred from the UWB framework to the UWBS to set device configuration parameters on the UWBS. The UWBS may perform a predetermined operation according to the second UCI command.

Referring to part (a) of FIG. 14, the second UWB command may include a number-of-parameters field indicating the number of parameters and at least one parameter field. The number of at least one parameter field may correspond to the value of the number-of-parameters field.

Each parameter field has a TLV structure including a type field, a length field, and a value field.

The at least one parameter field may include a field for an active ranging round parameter.

The active ranging round of the active ranging round parameter may be determined by the UWB framework or application layer, which is an upper layer of UWBS, as described above.

Referring to part (b) of FIG. 14, the active ranging round parameter may be one of an active ranging round bitmap parameter (first active ranging round parameter) (alt.1) or an active ranging round list parameter (second active ranging round parameter) (alt.2).

The active ranging round bitmap parameter may include a bitmap representing the index of the ranging round in which the UWB device operates in the active state. For example, when the active ranging round bitmap parameter is set to '10110000 . . . 00,' the active ranging round bitmap parameter may indicate that ranging rounds Nos. 1, 3, and 4 correspond to active rounds, and the remaining rounds correspond to inactive rounds. In this case, the UWB device may operate in the active state in the first, third, and fourth ranging rounds and in the inactive state (sleep state) in the remaining rounds. The setting of the active ranging round bitmap parameter may be applied to the UWBS in the current ranging block in which the active ranging round bitmap parameter is received or in a next ranging block to the current ranging block.

The active ranging round list parameter may include a list of indexes of ranging rounds in which the UWB device operates in the active state. For example, when the active ranging round list parameter is set to '0x010304,' the active ranging round list parameter may indicate that ranging rounds Nos. 1, 3, and 4 correspond to active rounds, and the remaining rounds correspond to inactive rounds. In this case, the UWB device may operate in the active state in the first, third, and fourth ranging rounds and in the inactive state (sleep state) in the remaining rounds. As an embodiment, the setting of the active ranging round list parameter may be applied to the UWBS in the current ranging block in which the active ranging round list parameter is received or in a next ranging block to the current ranging block.

When a second UCI command (CORE_SET_CONFIG_CMD) is used to transfer the active ranging round parameter, the block striding length parameter may be transferred via a second UCI command or a third UCI command (e.g., SESSION_SET_APP_CONFIG_CMD) different from the second UCI command. The block striding length parameter may be referred to as a block stride length parameter.

The third UCI command may be a UCI command used to set an APP configuration parameter for the corresponding UWB session, on the UWBS. In an embodiment, the third UCI command, like the second UCI command, may include at least one parameter field having a TVL structure, and the at least one parameter field may include a field for a block striding length parameter.

The block striding length parameter may indicate the number of ranging blocks to be skipped. For example, the block striding length parameter may indicate how many ranging blocks are skipped after the current ranging block in which the block striding length parameter is received is completed. As described above, in the ranging round to be skipped, the UWB device may operate in the inactive state (sleep state). In other words, the UWB device does not overhear the ranging messages from the UWB anchors in the skipped ranging block.

Second Embodiment (Power Saving Operation According to Control of the UWBS)

In the second embodiment, the power saving operation may be performed or controlled by the UWBS itself without the aid of the upper layer of the UWBS. If the UWBS itself is equipped with a power saving function, it is possible to sufficiently reduce power consumption without performing a separate operation in the upper layer. As such, controlling the power saving operation at the UWBS level eliminates the need for an operation (command/response/notification operation) of interfacing with the upper layer to do so and thus allows for more rapid and accurate UWBS on/off operation processing (e.g., real-time on/off operation processing), as compared with controlling at the upper layer level.

2-1st Embodiment (Cluster (Cell) Filtering Based on the Strength of the Signal Received from the Initiator Anchor)

Figure 15:
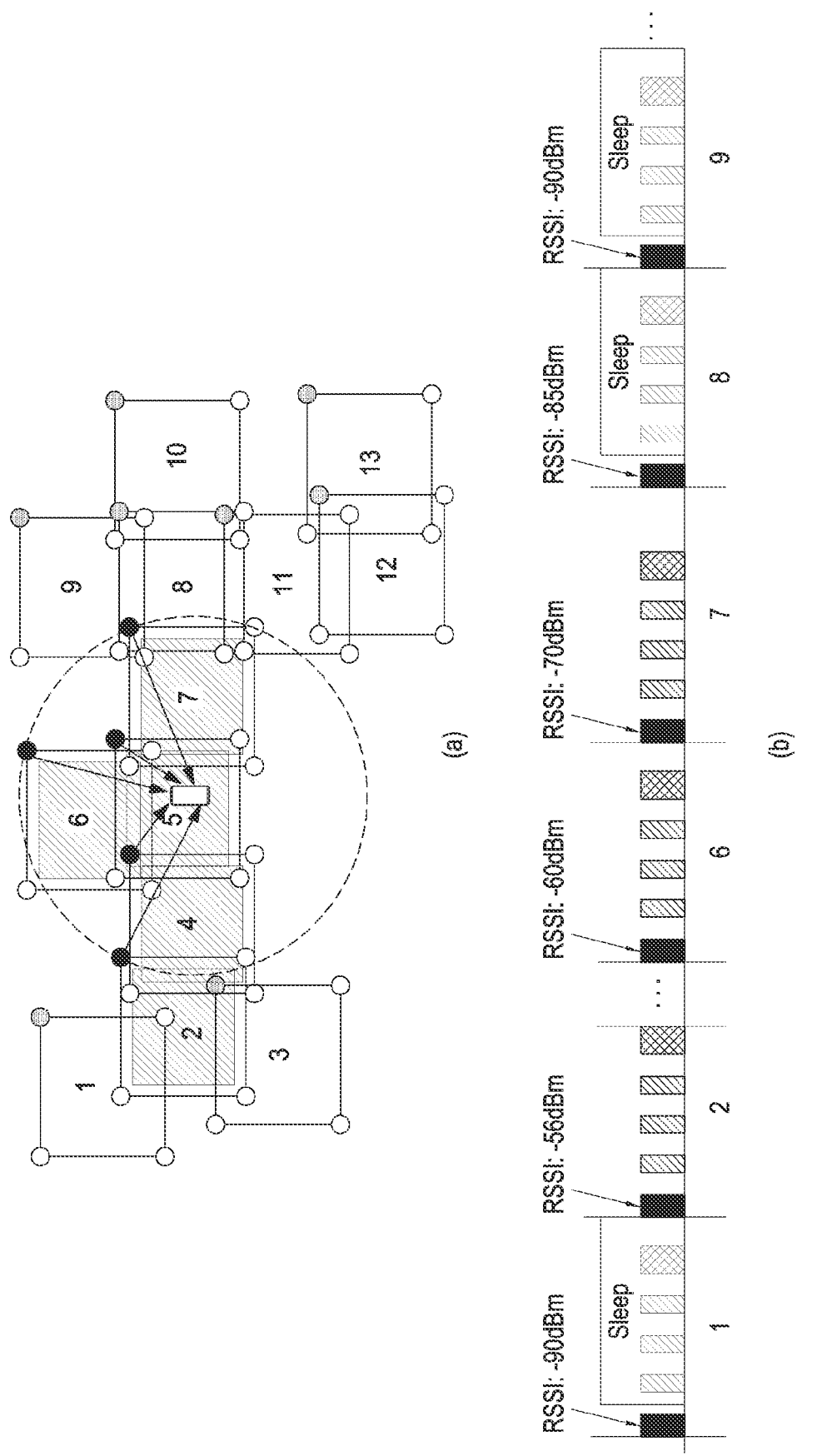
FIG. 15 illustrates a method in which a UWB device performs a power saving operation based on a signal strength, according to an embodiment.

FIG. 15 illustrates a method in which a UWB device performs a power saving operation based on a signal strength, according to an embodiment.

The embodiment of FIG. 15 corresponds to an example of the above-described second embodiment in which the power saving operation is controlled by the UWBS. Accordingly, the operation of the UWB device of FIG. 15 may be understood as the operation of the UWBS of the UWB device.

Referring to part (a) of FIG. 15, the UWB device may receive a ranging message (e.g., a poll message) from each initiator anchor of at least one cluster (operation 1). For example, as shown in part (a) of FIG. 15, the UWB device may receive a poll message from each initiator anchor of clusters 2, 4, 5, 6, and 7.

The UWB device may obtain the signal strength of the ranging message (operation 2). As an embodiment, the UWB device may obtain the received signal strength (e.g., received signal strength indicator (RSSI)) of the ranging message.

The UWB device may determine whether the signal strength of the ranging message is less than or equal to a preset threshold (e.g., −70 dBm) (operation 3). Examples of clusters having a signal strength less than or equal to the threshold may include clusters not used in the vicinity, clusters positioned far away from the UWB device, and clusters blocked by obstacles (e.g., walls, doors).

When the signal strength of the ranging message is less than or equal to the preset threshold, the UWB device may switch the ranging round of the cluster to which the initiator having transmitted the ranging message belongs, into the inactive ranging round (operation 4). In this case, the UWB device may operate in the inactive state without receiving a ranging message (e.g., a response message or a final message) transmitted later in the corresponding ranging round.

For example, referring to part (b) of FIG. 15, the UWB device may receive a poll message transmitted from the initiator anchor in each ranging round. As shown, the signal strength (RSSI) of the poll message received from the initiator anchor of the first cluster associated with the first ranging round may be −90 dbm, the signal strength (RSSI) of the poll message received from the initiator anchor of the second cluster associated with the second ranging round may be −56 dbm, the RSSI of the poll message received from the initiator anchor of the sixth cluster associated with the sixth ranging round may be −60 dbm, the signal strength (RSSI) of the poll message received from the initiator anchor of the seventh cluster associated with the seventh ringing round may be −70 dbm, the RSSI of the poll message received from the initiator anchor of the eighth cluster associated with the eighth ranging round may be −85 dbm, and the RSSI of the poll message received from the initiator anchor of the ninth cluster associated with the ninth ranging round may be −90 dbm. In this case, the UWB device may identify the ranging rounds (e.g., ranging rounds 1, 8, and 9) in which the poll message having a signal strength less than or equal to a preset threshold (−70 dBm) is received and may convert the ranging round into the inactive ranging round. In the ranging round switched into the inactive ranging round, the UWB device may operate in the inactive state (sleep state). In this case, the UWB device cannot receive the ranging messages of UWB anchors transmitted in the corresponding round.

The ranging round switched into the inactive ranging round based on the received signal strength in the current ranging block may remain the inactive ranging round even in the next ranging block(s). However, embodiments are not limited thereto. For example, the UWB device may identify the signal strength of the poll message of each initiator anchor each time in which case the UWB device may operate in the active state in the slot for transmission of the poll message in each ranging round of the next ranging block to receive the poll message of each initiator anchor. As another example, the UWB device may periodically identify the signal strength of the poll message of each initiator anchor. In this case, the UWB device may maintain the corresponding ranging round as the inactive ranging round in the ranging block before the ranging block (next period ranging block) that identifies the signal strength of the poll message in the next period and may switch the corresponding ranging round into the active ranging round in the next period ranging block.

2-2nd Embodiment (Cluster (Cell) Filtering Based on User Location in UWBS)

FIG. 16 illustrates a method in which a UWB device performs a power saving operation based on a user location, according to an embodiment.

The embodiment of FIG. 16 corresponds to an example of the above-described second embodiment in which the power saving operation is controlled by the UWBS.

The operation of the UWB device of FIG. 16 corresponds to the operation of the UWBS of the UWB device. Accordingly, the operation of the UWB device of FIG. 16 may be understood as the operation of the UWBS of the UWB device.

Referring to part (a) of FIG. 16, the UWB device may receive ranging messages (e.g., poll/response/final message) from UWB anchors of at least one cluster (operation 1).

The ranging messages transmitted from the cluster may include additional information (necessary additional information) necessary for the UWBS of the UWB device to calculate (or estimate) the location of the UWB device (user). The UWBS may have computational power capable of estimating the user's location using the necessary information without the aid of the higher layer.

The necessary additional information may further include information (anchor location information) about the coordinates of anchors belonging to the corresponding cluster or all of the clusters and/or map information including the cluster deployment structure.

The necessary additional information may be included in at least one of the poll message, the response message, or the final message.

The UWB device may estimate (or calculate) the location of the UWB device based on the information included in the received ranging messages. Thus, the location coordinates of the UWB device may be obtained (operation 2-1).

In this case, the UWB device may select an active ranging round based on the estimated location. For example, as shown in part (a) of FIG. 16, the UWB device may select adjacent clusters (e.g., clusters 4, 5, 6, and 7) as active clusters based on the estimated location coordinates (x,y). As shown in part (b) of FIG. 16, the UWB device may select the ranging rounds (e.g., ranging rounds 4, 5, 6, and 7) associated with the clusters selected as the active clusters, as active rounds. In this case, the remaining ranging rounds (e.g., ranging rounds 1, 2, 8, and 9) may be selected as inactive ranging rounds.

In another embodiment, the UWB device may estimate (or calculate) the TDoA value based on the information included in the received ranging messages (operation 2-2).

In this case, the UWB device may estimate the nearest cluster based on the distribution of the calculated TDoA values. For example, the UWB device may determine the index of the nearest cluster (cell) based on Equation (2), below.

$$\text{nearest cell index} = \operatorname{argmin}_{index_{cell}} \{\Sigma_{i=1}^{N_{resp}} |\text{tdoa}_i(\text{index}_{cell})|\} \quad (2)$$

In Equation (2), $index_{cell}$ denotes the index of the cluster (cell), and $\text{tdoa}_i(\text{index}_{cell})$ denotes the tdoa value with the ith responder UWB anchor of the cluster (cell) whose index is $index_{cell}$ and with the initiator UWB anchor.

$\Sigma_{i=1}^{N_{resp}} |\text{tdoa}_i (\text{index}_{cell})|$ is the sum of the absolute values of tdoa calculated in the cluster (cell) whose index is $index_{cell}$.

$\operatorname{argmin}_{index_{cell}} \Sigma_{i=1}^{N_{resp}} |\text{tdoa}_i(\text{indeX}_{cell})|$ denotes the index of the cluster (cell) with the smallest sum of absolute values of tdoa.

For example, if the calculated tdoa values in cluster 1 are $-0.5$, 1, and 1.5, $\Sigma_{i=1}^{N_{resp}} |\text{tdoa}_i(\text{indeX}_{cell})|$ is 3 ($=|-0.5|+|1|+|1.5|$).

The qualitative meaning of Equation (2), above, is that if the UWB device is located in the center of a cluster, the TDoA value is calculated as close to 0—in other words, it may be described as a scheme for estimating the center of the cluster nearest to the UWB device using the nature that the distances between the UWB anchors and the UWB device are similar.

The UWB device may select an active round based on information about the nearest cluster. For example, as shown in part (a) of FIG. 16, the UWB device may select the nearest cluster (e.g., cluster 5) and clusters (e.g., clusters 4, 6, and 7) adjacent to the nearest cluster as active clusters and, as shown in part (b) of FIG. 16, the UWB device may select the ranging rounds (e.g., ranging rounds 4, 5, 6, and 7) associated with the clusters selected as the active clusters, as active rounds. In this case, the remaining ranging rounds (e.g., ranging rounds 1, 2, 8, and 9) may be selected as inactive ranging rounds.

Upon calculating TDoA (TDoA distribution) instead of directly calculating the location of the UWB device, the TDoA may be calculated, and lower computational power is required although the UWB device receives only some ranging messages (e.g., receiving the poll message of the initiator anchor and the response messages of two responder anchors), rather than receiving all of the ranging messages transmitted from the corresponding cluster.

2-3rd Embodiment (Cluster (Cell) Filtering Based on the Strength of Signals Received from a Plurality of Initiator Anchors in a Specific Ranging Round) (Ranging Message (Poll/Response/Final Message) Traffic Shaping Embodiment)

Figure 17:
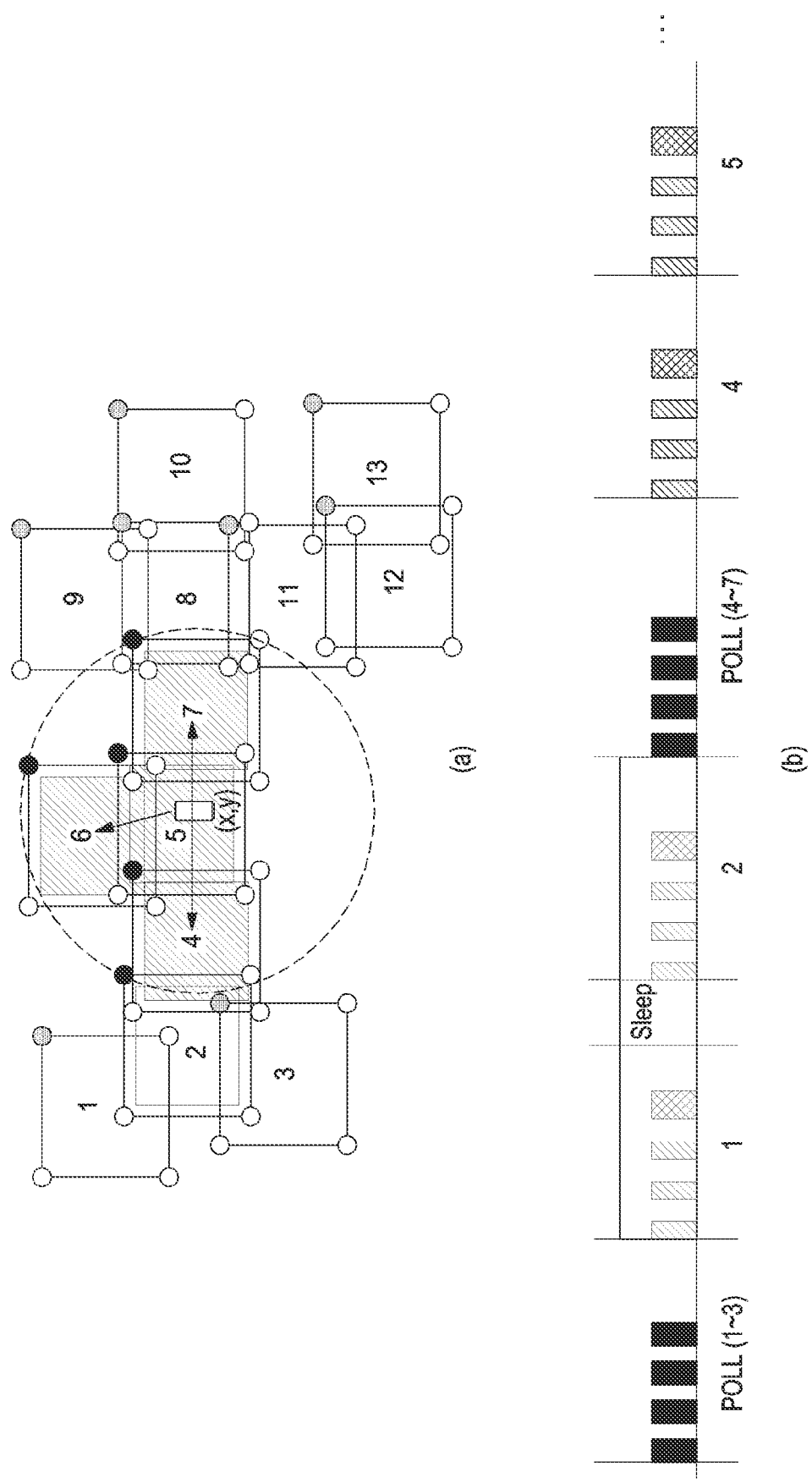
FIG. 17 illustrates a method in which a UWB device performs a power saving operation based on a received signal strength in a specific ranging round, according to an embodiment.

FIG. 17 illustrates a method in which a UWB device performs a power saving operation based on a received signal strength in a specific ranging round, according to an embodiment.

The embodiment of FIG. 17 corresponds to an example of the above-described second embodiment in which the power saving operation is controlled by the UWBS.

The operation of the UWB device of FIG. 17 corresponds to the operation of the UWBS of the UWB device. Accordingly, the operation of the UWB device of FIG. 16 may be understood as the operation of the UWBS of the UWB device.

In the embodiment of FIG. 17, the ranging round in which the poll message transmitted from the initiator anchor is transmitted, and the ranging round in which the response message transmitted from the responder anchor and the final message transmitted from the initiator anchor are transmitted are distinguished from each other. In this disclosure, the ranging round in which only the poll message is transmitted may be referred to as a poll ranging round.

In the embodiment of FIG. 17, the ranging block may include at least one poll ranging round.

In the embodiment of FIG. 17, it is assumed that remaining ranging rounds other than the poll ranging round are initially set as inactive rounds. In other words, the UWB device may initially operate in the active state in the poll ranging round and may operate in the inactive state (sleep state) in the remaining ranging rounds. However, without limitations thereto, the UWB device may initially operate in the active state in the poll ranging round and the remaining ranging rounds.

Referring to part (a) of FIG. 17, the UWB device may receive the poll message from a plurality of initiator anchors in the poll ranging round (operation 1). As an embodiment, the poll ranging round may be positioned before the ranging round of each cluster to which a plurality of initiator anchors transmitting the poll message in the poll ranging round belong.

In an embodiment, one ranging block may include a plurality of poll ranging rounds. In this case, the UWB device may receive the poll messages transmitted from some initiator anchors among all of the deployed clusters in each poll range round. For example, as shown in part (b) of FIG. 17, the UWB device may receive the poll message transmitted from each initiator anchor of clusters 1, 2, and 3 in the first poll ranging round and receive the poll message transmitted from each initiator anchor of clusters 4, 5, 6, and 7 in the second ranging round. In this case, the first poll ranging round is positioned before each ranging round of clusters 1, 2, and 3, and the second ranging round is positioned before each ranging round of clusters 4, 5, 6 and 7.

In another embodiment, one ranging block may include one ranging round. In this case, the UWB device may receive the messages transmitted from the initiator anchors of all of the deployed clusters in a single poll range round. For example, the UWB device may receive the message transmitted from each initiator anchor of all the clusters (clusters 1 to 13) in one poll ranging round.

The UWB device may obtain the received signal strength of the poll message. The UWB device may measure the received signal strength for each of the poll messages received in the corresponding poll ranging round.

The UWB device may determine whether the signal strength of the poll message is greater than or equal to a preset threshold (e.g., −70 dBm) (operation 2).

When the signal strength of the poll message is greater than or equal to the preset threshold, the UWB device may select the ranging round of the cluster to which the initiator anchor having transmitted the corresponding poll message belongs, as the active ranging round (operation 3). In this case, the UWB device may receive the response message and the final message transmitted after the corresponding poll message in the corresponding ranging round (operation 3-1). For example, as shown in part (a) of FIG. 17, the signal strength of the poll message received in the second poll ranging round from each initiator anchor of clusters 4,5, 6, and 7 adjacent to the UWB device may be greater than or equal to the threshold. In this case, as shown in part (b) of FIG. 17, the ranging rounds of clusters 4, 5, 6, and 7 may be selected as active ranging rounds. Accordingly, the UWB device may operate in the active state or wake up in the corresponding active ranging round, receiving the response message and final message.

When the signal strength of the poll message is less than the preset threshold, the UWB device may select the ranging round of the cluster to which the initiator anchor having transmitted the corresponding poll message belongs, as the inactive ranging round (operation 4). In this case, the UWB device may operate in the inactive state (sleep state) in the corresponding ranging round and cannot receive the response message and the final message transmitted in the corresponding ranging round (operation 4-1). For example, as shown in part (a) of FIG. 17, the signal strength of the poll message received in the first poll ranging round from each initiator anchor of clusters 1, 2, and 3 far from the UWB device may be less than the threshold. In this case, as shown in part (b) of FIG. 17, the ranging rounds of clusters 1, 2, and 3 may be selected as inactive ranging rounds. Accordingly, the UWB device may operate in the inactive state or sleep in the corresponding active ranging round and thus may not receive the response message and final message.

In the embodiment of FIG. 17, as compared to the embodiment of FIG. 15, the successive duration when the UWB device operates in the sleep state is longer. For example, as shown in part (b) of FIG. 17, the UWB device may operate in the sleep state successively in three adjacent ranging rounds. In this case, it is possible to reduce power consumption due to frequent state switches (e.g., switch from the active state to sleep state or switch from the sleep state to active state).

However, in the embodiment of FIG. 17, as compared to the embodiment of FIG. 15, a separate ranging round for transmission of only a poll message needs to be set. This may reduce the efficiency of resource use.

Therefore, it is necessary to appropriately select and use the embodiment of FIG. 15 or the embodiment of FIG. 17 according to the context.

2-4th Embodiment (Cluster (Cell) Selection and Handover Embodiment)

Figure 18:
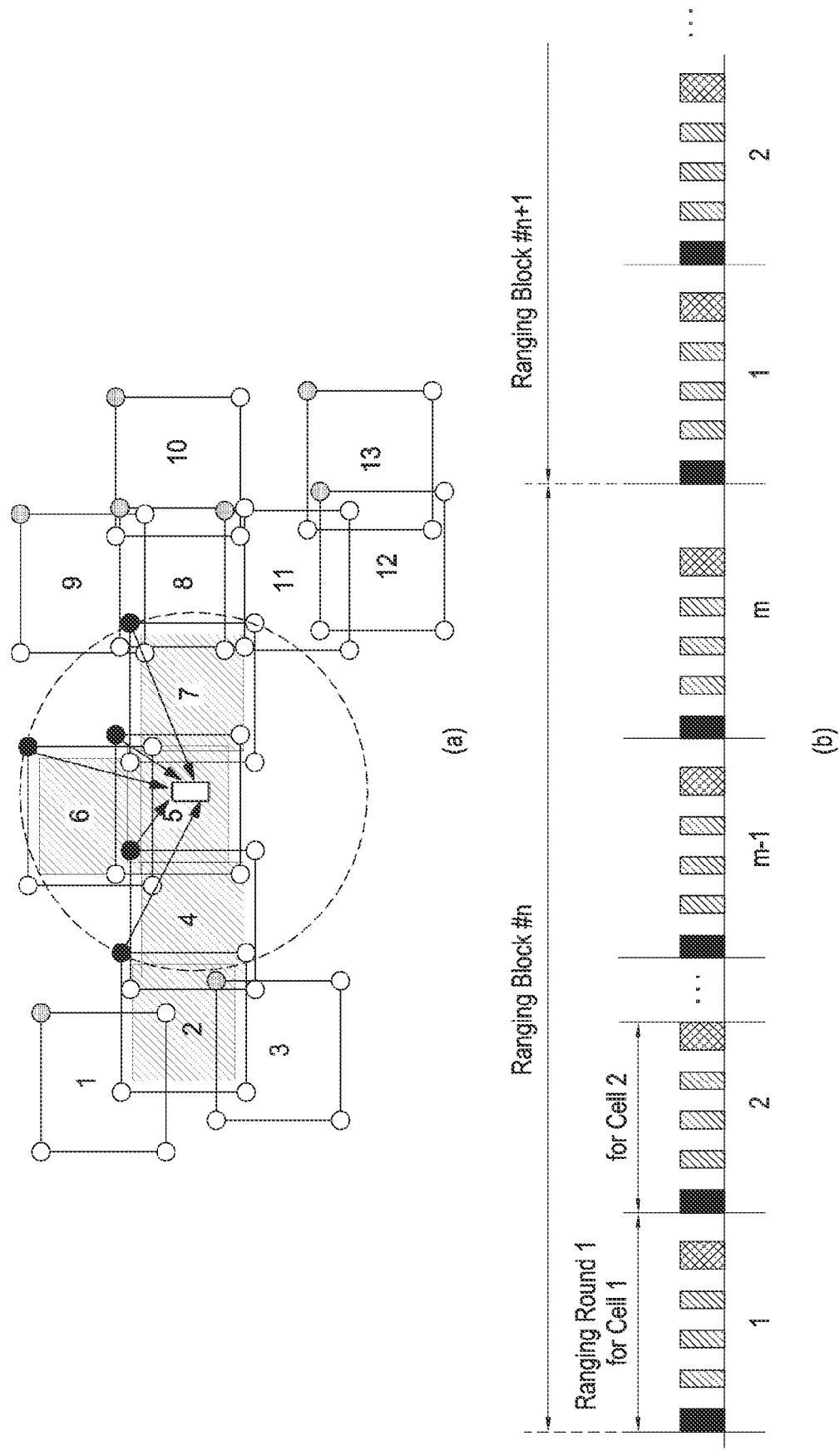
FIG. 18 illustrates an example of a cluster deployment structure and a ranging block structure for a UWB device to perform a cluster selection and handover operations according to an embodiment.

FIG. 18 illustrates an example of a cluster deployment structure and a ranging block structure for a UWB device to perform a cluster selection and handover operations according to an embodiment.

FIG. 18 provides an example of the above-described second embodiment in which the power saving operation is controlled by the UWBS.

The operation of the UWB device of FIG. 18 corresponds to the operation of the UWBS of the UWB device. Accordingly, the operation of the UWB device of FIG. 18 may be understood as the operation of the UWBS of the UWB device.

Referring to part (a) of FIG. 18, UWB anchors may be appropriately deployed in a specific area for cluster selection and handover. Further, the plurality of UWB anchors may constitute one cluster. For example, as shown, four UWB anchors may be deployed at each vertex of a substantially square area or a substantially rectangular area, and the so-deployed four UWB anchors may constitute one cluster corresponding to the corresponding area. However, embodiments are not limited thereto, and the number of anchors constituting the cluster may vary. Further, the plurality of anchors constituting the cluster may be deployed in various schemes (e.g., deployed at each vertex of a regular pentagon).

Referring to part (b) of FIG. 18, a ranging round may be allocated to each cluster. For example, as illustrated, the ranging block may include a ranging round allocated to each cluster.

As an embodiment, in the case of an OOB- or APP-based positioning scheme, UWB anchors do not need to transmit their own location information. In this case, the location information about the anchors may be transferred to the UWB device through an OOB procedure or an app installation procedure before performing the DL-TDoA operation. Otherwise (e.g., in the case of a power saving operation under the control of the UWBS), the UWB anchors should include their location information in their messages/packets.

Rather than receiving messages/packets from the UWB anchors of all the clusters as shown in part (a) of FIG. 18, the UWB device may use selective scanning for receiving messages/packets from all or some UWB anchors (e.g., initiator (master) anchor) of some clusters. Use of selective scanning may reduce the power consumption of the UWB device. For such selective scanning and continuous localization, a cluster selection and handover mechanism, which is described below, is required.

A cluster selection and handover mechanism is described below with reference to FIGS. 19 and 20.

Figure 19:
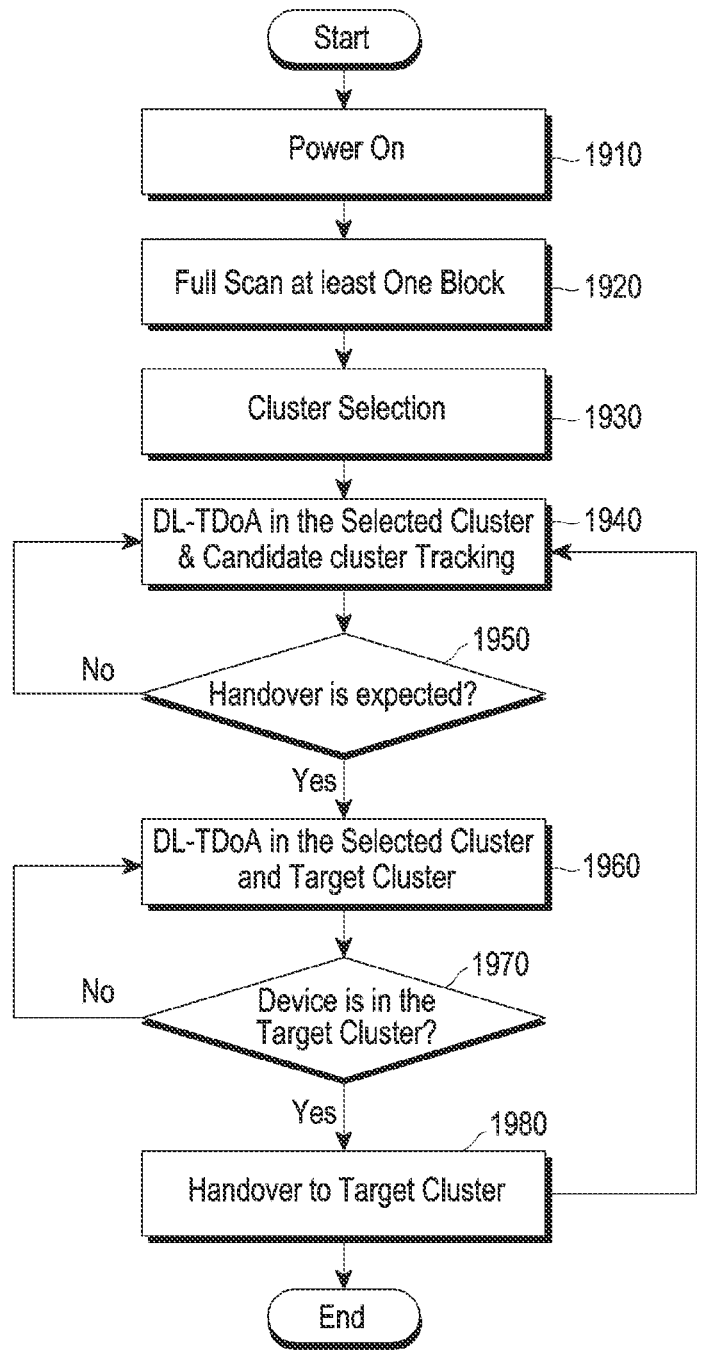
FIG. 19 is a flowchart illustrating a method in which a UWB device performs a cluster selection and handover operation according to an embodiment.

FIG. 19 is a flowchart illustrating a method in which a UWB device performs a cluster selection and handover operation according to an embodiment.

Figure 20A:
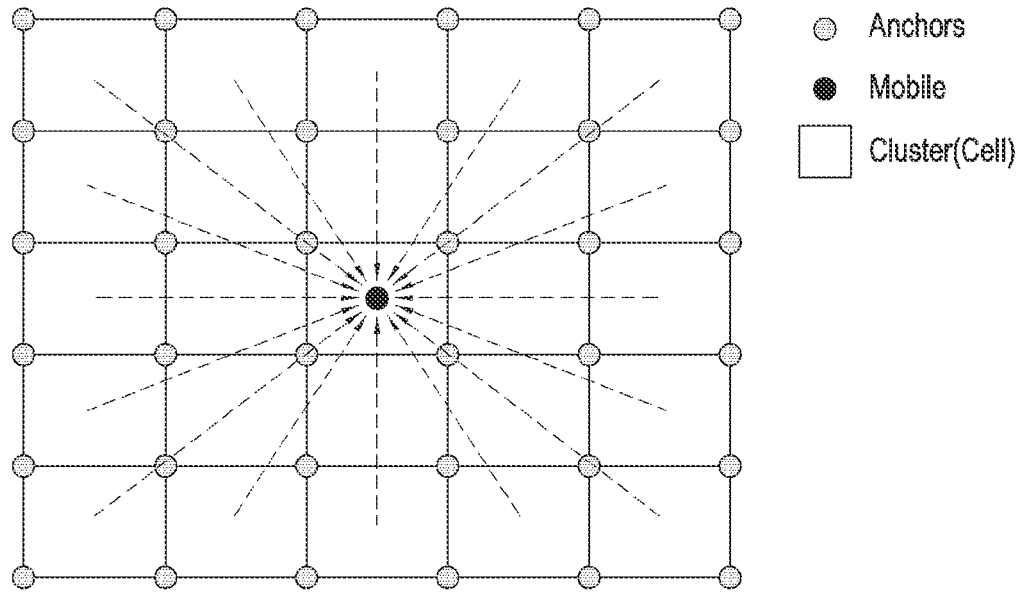
FIGS. 20A, 20B, 20C, 20D, 20E, 20F, and 20G illustrate a signal flow corresponding to each operation of a method for a UWB device to perform a cluster selection and handover operation according to an embodiment.
Figure 20B:
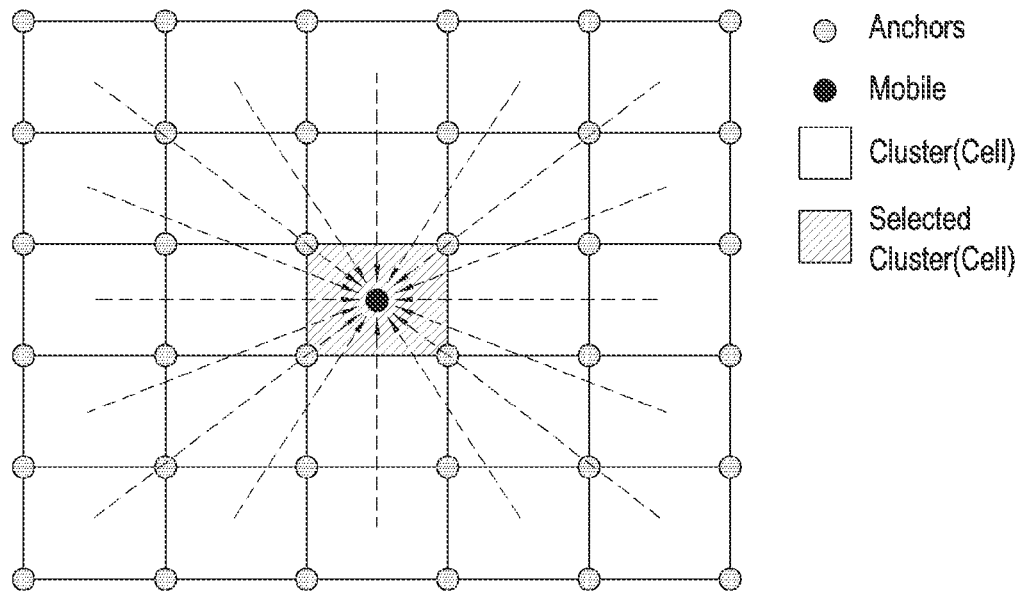
Figure 20C:
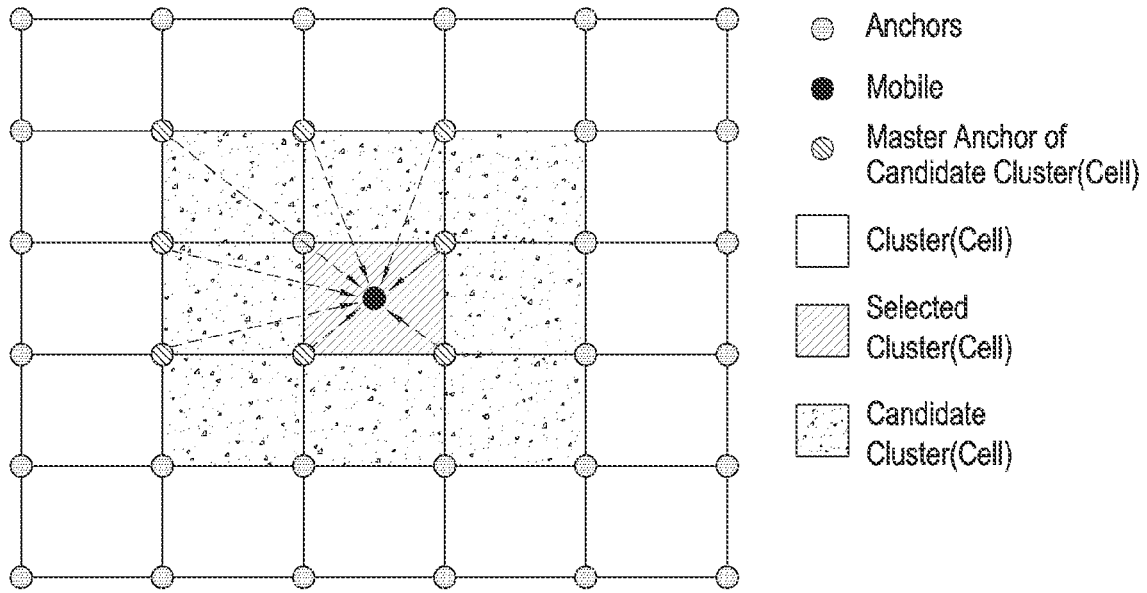
Figure 20D:
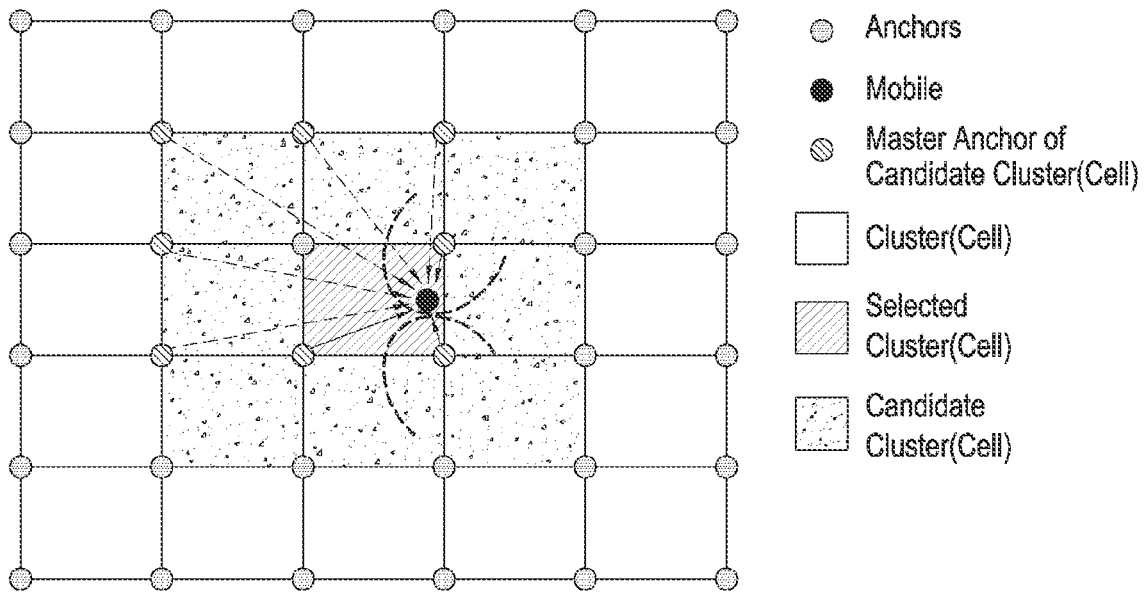
Figure 20E:
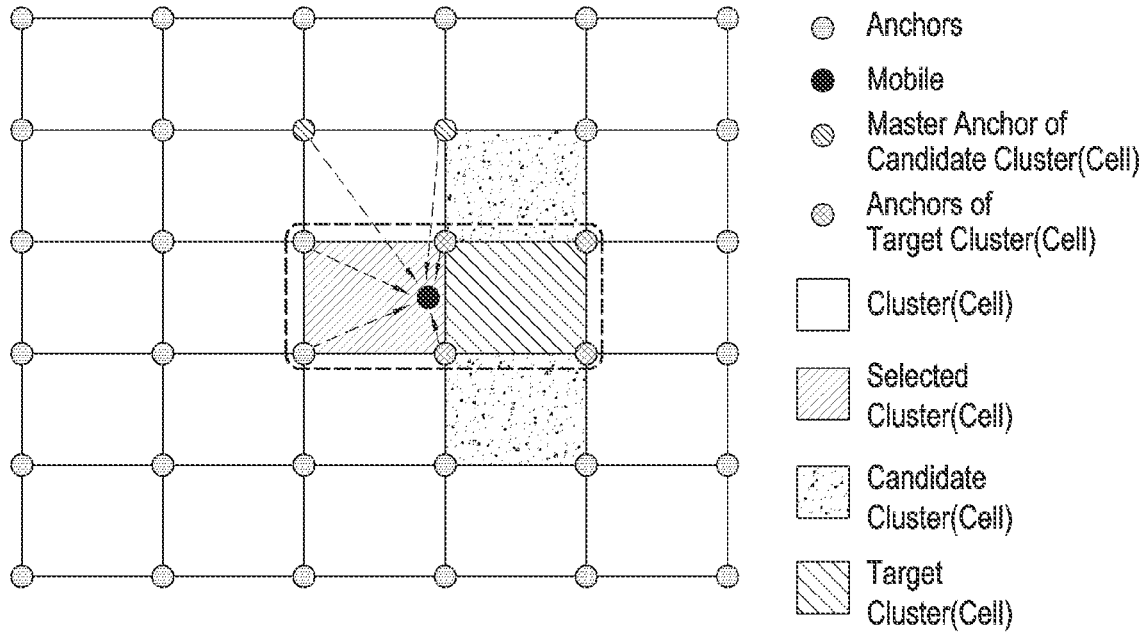
Figure 20F:
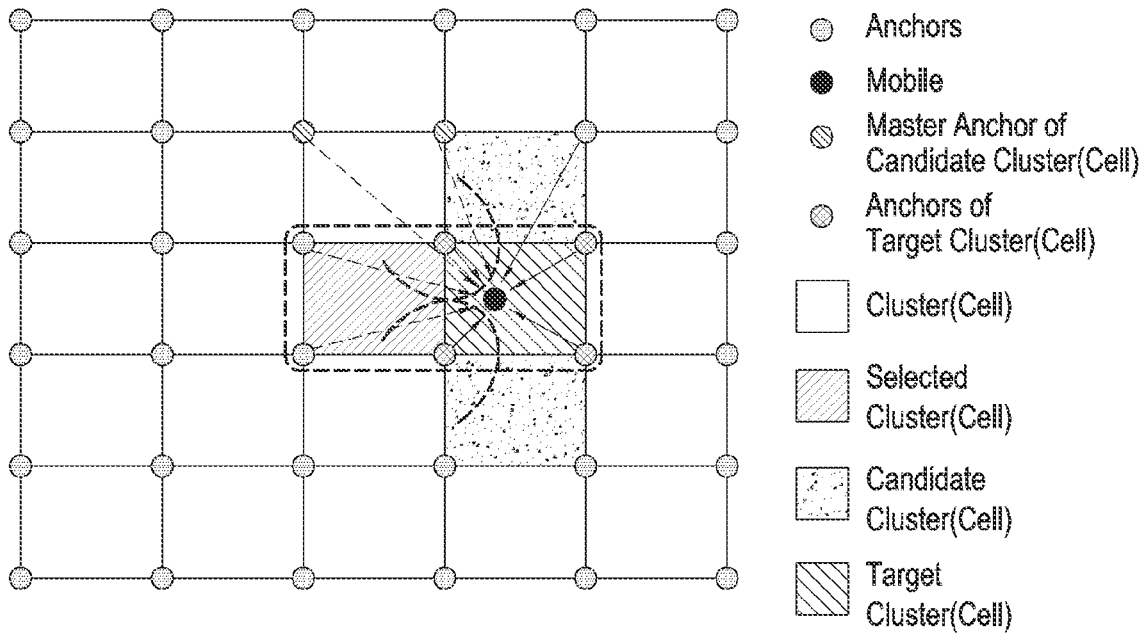
Figure 20G:
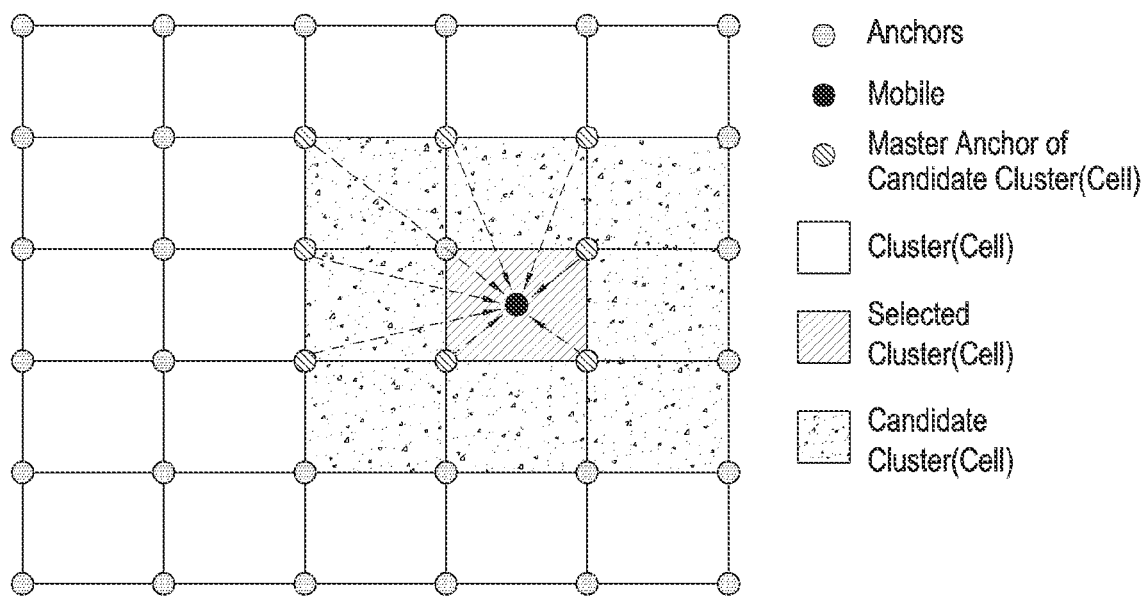

FIGS. 20A, 20B, 20C, 20D, 20E, 20F, and 20G illustrate a signal flow corresponding to each operation of a method for a UWB device to perform a cluster selection and handover operation according to an embodiment;

In the embodiment of FIGS. 19 through 20G, it is assumed that UWB anchors are properly deployed in a specific area. It is also assumed that the UWB anchors transmit their own messages in their scheduled slots. It is also assumed that one cluster (cell) has its own round (ranging round). It is also assumed that the master anchor of the cluster includes the length of the ranging block in its message. As an embodiment, at least one of the anchors of the cluster deployed in the corresponding area may be set as the master anchor. For example, the initiator anchor of the corresponding cluster may be set as the master anchor. In the embodiment of FIGS. 19 through 20G, it is assumed that the initiator anchor is the master anchor.

In the embodiment of FIGS. 19 through 20G, the user's UWB device may be referred to as a mobile or mobile device.

Referring to FIG. 19, the UWB device may power on the device (operation 1910). When powered on, the UWB device may operate in an initial state.

The UWB device may perform full scanning on at least one ranging block (operation 1920). After powered on, the UWB device may perform full scanning on at least one ranging block. Through such full scanning, the UWB device may obtain an average value (signal strength average value) of signal strengths (RSSIs) for the signals received from the UWB anchors in each cluster. To stabilize the signal strength average value, the UWB device may perform full scanning on a plurality of ranging blocks as many times as necessary.

Referring to FIG. 20A, in the full scanning operation, the UWB device (mobile) may receive signals from all deployed clusters. Thus, a signal strength average value for each cluster may be obtained.

The UWB device may select a specific cluster (operation 1930). As an embodiment, the UWB device may select the cluster having the highest average signal strength value by comparing the respective average signal strength values of the clusters. The UWB device may use an additional index to select a cluster.

Referring to FIG. 20B, in the cluster selection operation, the selected cluster may correspond to the cluster in which the UWB device is currently located.

The UWB device may perform a DL-TDoA operation in the selected cluster and may track candidate cluster(s) (operation 1940). As an embodiment, the UWB device may track the RSSI of each initiator (master) anchor of the candidate cluster(s) by scanning the first slot of the ranging round(s) allocated to the candidate cluster(s). The UWB device may use an additional index to reduce the number of candidate cluster(s).

Referring to FIG. 20C, in the DL-TDoA and candidate cluster tracking operation, the UWB device may receive the messages (e.g., poll/response/final message) transmitted from each anchor of the selected cluster and perform the DL-TDoA operation. The UWB device may receive, e.g., messages (e.g., poll messages) from the respective initiator (master) anchors of the plurality of candidate clusters adjacent to the selected cluster.

The UWB device may determine whether a handover is expected (operation 1950). In other words, the UWB device may prepare for handover.

The UWB device may prepare for handover when some or all of the following conditions are met:
RSSI(s) for a specific candidate cluster is increased
RSSI(s) for a specific candidate cluster meets a threshold
The UWB device may use an additional index to determine whether to prepare for handover. (In an embodiment, the additional index may be a motion pattern of the UWB device estimated from the accelerometer and inertial sensor of the UWB device. For example, if the motion of the UWB device estimated through the values of the accelerometer and inertial sensor of the UWB device is 'stop', the UWB device may not prepare for handover.)

The UWB device may select one or more clusters as target clusters for handover.

Referring to FIG. 20D, in the handover preparation operation, the UWB device may receive messages from the respective initiator (master) anchors of the candidate clusters and identify changes in RSSIs for each cluster.

If the handover is not expected, the UWB device may repeat operation 1940.

When handover is expected, the UWB device may perform a DL-TDoA operation in the selected cluster and the target cluster (operation 1960). Thus, the UWB device may obtain the location of the UWB device in each cluster or in a virtual integrated cluster. The UWB device may obtain an average value of received signal strengths (RSSIs) for each cluster.

Referring to FIG. 20E, in the DL-TDoA operation in the selected cluster and the target cluster, the UWB device may receive messages from the respective anchors of the selected cluster and the target cluster and, based thereupon, obtain the location of the UWB device and the average value of the received signal strengths (RSSIs) for each cluster.

The UWB device may determine whether the device is within the target cluster (operation 1970). Thus, the UWB device may determine whether to perform the handover.

The UWB device may determine that the device is in the target cluster when some or all of the following conditions are met:
The average value of RSSIs for the target cluster has the highest value
RSSIs of candidate clusters of the target cluster are not higher than the threshold
The UWB device may use an additional index to determine whether to prepare for handover. (In an embodiment, the additional index may be a motion pattern of the UWB device estimated from the accelerometer and inertial sensor of the UWB device. For example, if the motion of the UWB device estimated through the values of the accelerometer and inertial sensor of the UWB device is 'stop', the UWB device may not prepare for handover.)

Referring to FIG. 20F, in the handover determination operation, the UWB device may receive messages from the respective anchors of the selected cluster and the target cluster. The UWB device may receive a message from a specific anchor (e.g., an initiator anchor) of each candidate cluster(s) of the target cluster. Thus, it is possible to obtain a signal strength average value for each of the selected cluster, the target cluster, and the candidate cluster(s) of the target cluster.

When the device is not in the target cluster, the UWB device may repeat operation 1960.

When the device is in the target cluster, the UWB device may hand over to the target cluster (operation 1980). After handover to the target cluster, the UWB device may treat the target cluster as the selected cluster and set the neighbor cluster(s) of the target cluster as a candidate cluster.

Referring to FIG. 20G, in the handover operation, the target cluster may be treated as the selected cluster, and the clusters adjacent to the target cluster may be set as candidate clusters. In this case, the UWB device may repeat the above-described operations 1940 to 1980 based on the changed, selected cluster and candidate cluster.

Figure 21:
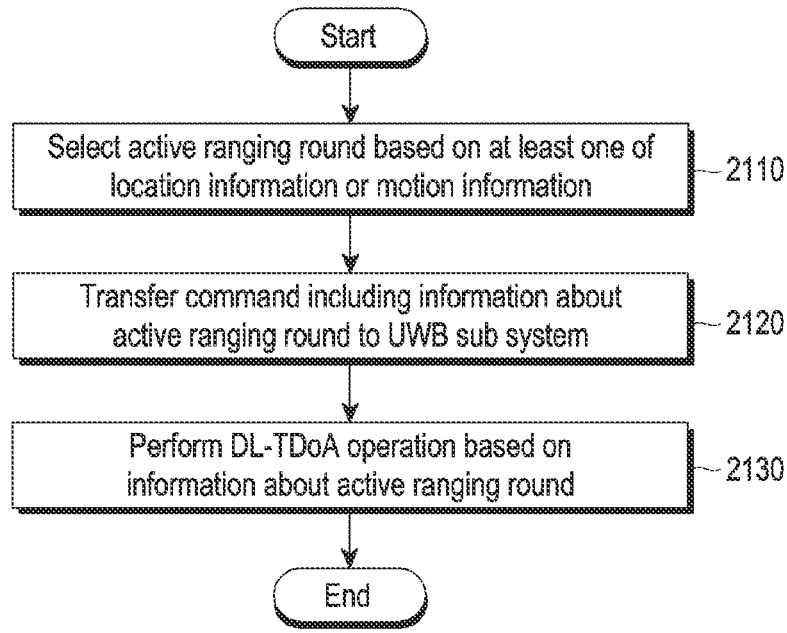
FIG. 21 illustrates a first method of a UWB device according to an embodiment.

FIG. 21 illustrates a first method of a UWB device according to an embodiment.

In FIG. 21, the UWB device may correspond to the UWB device of FIG. 1, include a UWB device, or may be an electronic device that may include a portion of a UWB device.

In FIG. 21, the UWB device may be a UWB device serving as a tag for DL-TDoA.

The first method for the embodiment of FIG. 21 may be performed by the upper layer of the UWB device (e.g., the UWB framework or application layer or a processor (application processor) including the UWB framework and the application). The method of FIG. 21 may refer to the description of the method of FIGS. 10 to 14.

Referring to FIG. 21, the UWB device may select at least one active ranging round from a ranging block based on at least one of location information or motion information about the UWB device (operation 2110).

The UWB device may transfer a command including information about the at least one active ranging round to the UWB subsystem (operation 2120).

The UWB device may perform a DL-TDoA operation based on the information about the at least one active ranging round (operation 2130).

The motion information may include information about the moving direction of the UWB device.

The information about the at least one active ranging round may include first information including a bit map indicating the index of the at least one active ranging round or second information including a list of indexes of the at least one active ranging round.

The command may further include information indicating the number of ranging blocks to be skipped.

The ranging block may include a plurality of ranging rounds respectively allocated to the plurality of clusters, and each of the clusters may include a plurality of UWB anchors.

Figure 22:
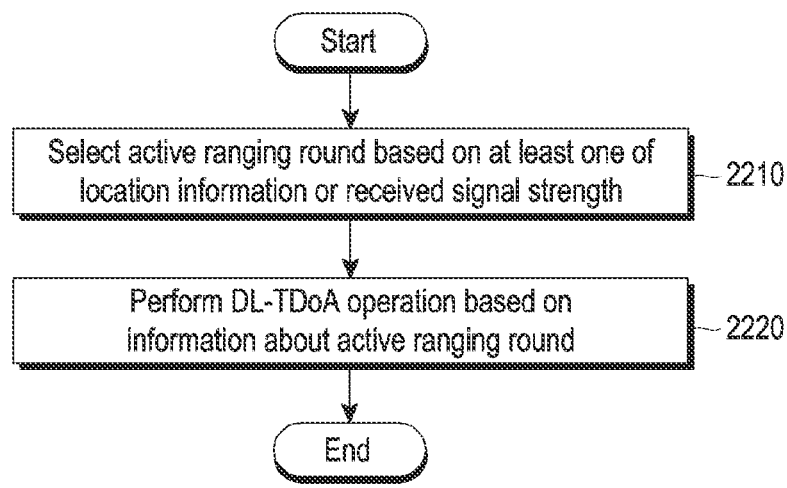
FIG. 22 illustrates a second method of a UWB device according to an embodiment.

FIG. 22 illustrates a second method of a UWB device according to an embodiment.

In FIG. 22, the UWB device may correspond to the UWB device of FIG. 1, include a UWB device, or may be an electronic device that may include a portion of a UWB device.

In FIG. 22, the UWB device may be a UWB device serving as a tag for DL-TDoA.

The first method for the embodiment of FIG. 22 may be performed by the UWB subsystem (UWB chip) of the UWB device. The method of FIG. 22 may refer to the description of the method of FIGS. 15 to 20.

Referring to FIG. 22, the UWB device may select at least one active ranging round from a ranging block based on at least one of location information or received signal strength information about the UWB device (operation 2210).

The UWB device may perform a DL-TDoA operation based on the information about the at least one active ranging round (operation 2220).

The received signal strength information may be obtained based on a plurality of first messages received from the respective initiator UWB anchors of the plurality of clusters.

The plurality of first messages may be respectively received in the ranging rounds allocated for the corresponding clusters, or the plurality of first messages may be received together in the ranging round allocated for the plurality of first messages.

The information about the at least one active ranging round may include first information including a bit map indicating the index of the at least one active ranging round or second information including a list of indexes of the at least one active ranging round.

The ranging block may include a plurality of ranging rounds respectively allocated to the plurality of clusters, and each of the clusters may include a plurality of UWB anchors.

The location information may be one of location coordinate information about the UWB device or information about the cluster nearest to the UWB device, and the information about the cluster nearest to the UWB device may be obtained based on the distribution of the TDoA values for each cluster.

Figure 23:
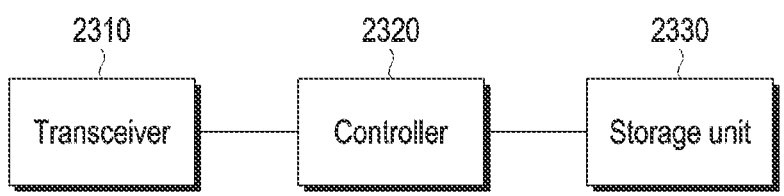
FIG. 23 illustrates a structure of a UWB device according to an embodiment.

FIG. 23 illustrates a structure of a UWB device according to an embodiment.

In FIG. 23, the UWB device may correspond to the UWB device of FIG. 1, include a UWB device, or may be an electronic device that may include a portion of a UWB device.

In FIG. 23, the UWB device may be a UWB device serving as a tag for DL-TDoA.

Referring to FIG. 23, the UWB device may include a transceiver 2310, a controller 2320, and a storage unit or memory 2330. The controller may be defined as a circuit or application-specific integrated circuit or at least one processor.

The transceiver 2310 may transmit and receive signals to/from another entity. The transceiver 2310 may transmit/receive data to/from another device through, e.g., UWB communication or OOB communication (e.g., BLE communication).

The controller 2320 may control the overall operation of the electronic device according to an embodiment. For example, the controller 2320 may control inter-block signal flow to perform the operations according to the above-described flowchart. Specifically, the controller 2420 may control the operation of the UWB device (e.g., the operation of the framework of the UWB device or the UWBS) described with reference to FIGS. 1 to 22. For example, the controller 2320 may receive the ranging messages transmitted by the UWB anchor and perform a DL-TDoA operation.

The storage unit 2330 may store at least one of information transmitted/received via the transceiver 2310 and information generated via the controller 2320. For example, the storage unit 2330 may store information and data (e.g., active ranging round information) necessary for the method described above with reference to FIGS. 1 to 22.

Figure 24:
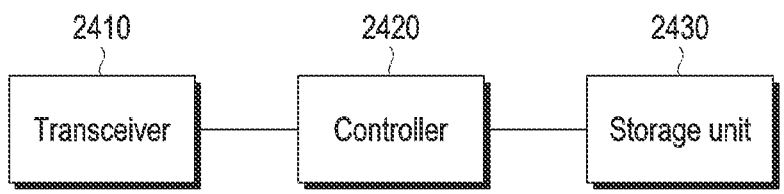
FIG. 24 illustrates a structure of an UWB anchor according to an embodiment.

FIG. 24 illustrates a structure of an UWB anchor according to an embodiment.

In FIG. 24, the UWB anchor may correspond to the UWB device of FIG. 1, include a UWB device, or may be an electronic device that may include a portion of a UWB device.

In FIG. 24, the UWB anchor may be a UWB device serving as an anchor for DL-TDoA. For example, the UWB anchor may be an initiator anchor or a responder anchor.

Referring to FIG. 24, the UWB anchor may include a transceiver 2410, a controller 2420, and a storage unit 2430. The controller may be defined as a circuit or application-specific integrated circuit or at least one processor.

The transceiver 2410 may transmit and receive signals to/from another entity. The transceiver 2410 may transmit/receive data to/from another device using, e.g., UWB communication.

The controller 2420 may control the overall operation of the electronic device according to an embodiment. For example, the controller 2420 may control inter-block signal flow to perform the operations according to the above-described flowchart. Specifically, the controller 2420 may control the operations of the UWB anchor (e.g., the ranging message transmission operation) described above with reference to FIGS. 1 to 22. For example, the controller 2420 may transmit ranging messages for the UWB anchor DL-TDoA.

The storage unit 2430 may store at least one of information transmitted/received via the transceiver 2410 and information generated via the controller 2420. For example, the storage unit 2430 may store information and data (e.g., reply time information and anchor location information) necessary for the method described above with reference to FIGS. 1 to 22.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments have been described above, various changes may be made thereto without departing from the scope of the disclosure. Thus, the scope of the disclosure should not be limited to the above-described embodiments, and should rather be defined by the following claims and equivalents thereof.

What is claimed is:

1. A method of operating an ultra-wide band (UWB) device, the method comprising:
   receiving, by a UWB subsystem (UWBS) of the UWB device, a first UWB subsystem command interface (UCI) message including first configuration information for downlink time difference of arrival (DL-TDoA) ranging, wherein the first configuration information includes a list of at least one index of at least one active ranging round in which the UWBS listens for at least one DL-TDoA Message (DTM) from at least one anchor device;
   receiving, by the UWBS, a second UCI message including second configuration information, wherein the second configuration information includes block striding information indicating a number of ranging blocks to be skipped;
   receiving, by the UWBS, at least one DTM based on the list of the at least one index and the block striding information; and
   determining a location of the UWB device based on the at least one DTM.

2. The method of claim 1, wherein the first configuration information further includes session identification (ID) information indicating an ID of a ranging session associated with the at least one active ranging round.

3. The method of claim 1, further comprising obtaining received signal strength information for the at least one DTM.

4. The method of claim 3, further comprising determining the at least one active ranging round based on at least one of moving pattern information of the UWB device, velocity information for the UWB device, the received signal strength information, or location information.

5. The method of claim 4, wherein the location information is one of location coordinate information of the UWB device or information on a cluster nearest to the UWB device, and the information on the cluster nearest to the UWB device is obtained based on a distribution of time difference of arrival (TDoA) values for each cluster.

6. The method of claim 1, further comprising obtaining, from the UWBS, location information of the at least one anchor device.

7. The method of claim 1, wherein the UWB device is configured to perform a role of a DL-TDoA tag device.

8. The method of claim 1, wherein the UWB device is configured not to receive the at least one DTM in a ranging round other than the at least one active ranging round in a ranging block.

9. The method of claim 1, further comprising obtaining, from the UWBS, ranging measurement information,
   wherein the ranging measurement information includes at least one of reply time information of a final DTM by an initiator anchor device and reply time information of a response DTM by a responder anchor device.

10. An ultra-wide band (UWB) device, comprising:
    a transceiver; and
    a controller connected to the transceiver,
    wherein the controller is configured to:
       receive, by a UWB subsystem (UWBS) of the UWB device, a first UWB subsystem command interface (UCI) message including first configuration information for downlink time difference of arrival (DL-TDoA) ranging, wherein the first configuration information includes a list of at least one index of at least one active ranging round in which the UWBS listens for at least one DL-TDoA message (DTM) from at least one anchor device,
       receive, by the UWBS. a second UCI message including second configuration information, wherein the second configuration information includes block striding information indicating a number of ranging blocks to be skipped;
       receive, by the UWBS, at least one DTM based on the list of the at least one index,
       and the block striding information, and
       determine a location of the UWB device based on the at least one DTM.

11. The UWB device of claim 10, wherein the first configuration information further includes session identification (ID) information indicating an ID of a ranging session associated with the at least one active ranging round.

12. The UWB device of claim 10, wherein the controller is further configured to obtain received signal strength information for the at least one DTM.

13. The UWB device of claim 12, wherein the controller is further configured to determine the at least one active ranging round based on at least one of moving pattern information of the UWB device, velocity information for the UWB device, the received signal strength information, or location information.

14. The UWB device of claim 13, wherein the location information is one of location coordinate information of the UWB device or information on a cluster nearest to the UWB device, and the information on the cluster nearest to the UWB device is obtained based on a distribution of time difference of arrival (TDoA) values for each cluster.

15. The UWB device of claim 10, wherein the controller is further configured to obtain, from the UWBS, location information of the at least one anchor device.

16. The UWB device of claim 10, wherein the UWB device is configured to perform a role of a DL-TDoA tag device.

17. The UWB device of claim 10, wherein the UWB device is configured not to receive the at least one DTM in a ranging round other than the at least one active ranging round in a ranging block.

18. The UWB device of claim 10, wherein the controller is further configured to obtain, from the UWBS, ranging measurement information, and > wherein the ranging measurement information includes at least one of reply time information of a final DTM by initiator anchor device and reply time information of a response DTM by a responder anchor device.

\* \* \* \* \*